United States Patent
Yamaguchi et al.

(10) Patent No.: US 6,795,097 B1
(45) Date of Patent: Sep. 21, 2004

(54) INFORMATION PROCESSING APPARATUS, INFORMATION PROCESSING METHOD, AND PROGRAM STORAGE MEDIUM FOR CONTROLLING AND DISPLAYING A MENU

(75) Inventors: Yoshihiro Yamaguchi, Tokyo (JP); Naoki Fujisawa, Kanagawa (JP); Keigo Ihara, Chiba (JP); Tetsuya Kohno, Kanagawa (JP); Tota Hasegawa, Tokyo (JP); Junichiro Sakata, Tokyo (JP); Tomoe Tanaka, Kanagawa (JP); Junji Ooi, Kanagawa (JP)

(73) Assignee: Sony Corporation, Tokyo (JP)

( * ) Notice: Subject to any disclaimer, the term of this patent is extended or adjusted under 35 U.S.C. 154(b) by 580 days.

(21) Appl. No.: 09/651,223

(22) Filed: Aug. 30, 2000

(30) Foreign Application Priority Data

Aug. 31, 1999 (JP) ............................................ 11-246479
Aug. 31, 1999 (JP) ............................................ 11-246480
Aug. 31, 1999 (JP) ............................................ 11-246481

(51) Int. Cl.[7] ................................................. G09G 5/00
(52) U.S. Cl. ...................... 345/810; 345/817; 345/818; 345/819; 345/820; 345/830; 345/853; 345/841; 345/859
(58) Field of Search ............................. 345/810, 812, 345/817, 818, 819, 820, 830, 833, 835, 853, 841, 859, 828, 829, 764, 743, 156

(56) References Cited

U.S. PATENT DOCUMENTS

| | | | | |
|---|---|---|---|---|
| 4,843,538 A | * | 6/1989 | Lane et al. | 700/83 |
| 5,559,945 A | * | 9/1996 | Beaudet et al. | 345/841 |
| 5,704,051 A | * | 12/1997 | Lane et al. | 345/855 |
| 6,037,937 A | * | 3/2000 | Beaton et al. | 345/764 |
| 6,049,336 A | * | 4/2000 | Liu et al. | 345/830 |
| 6,128,012 A | * | 10/2000 | Seidensticker et al. | 345/685 |
| 6,256,028 B1 | * | 7/2001 | Sanford et al. | 345/841 |
| 6,259,446 B1 | * | 7/2001 | Matheny et al. | 345/764 |
| 6,483,500 B1 | * | 11/2002 | Choi et al. | 345/184 |

* cited by examiner

*Primary Examiner*—Ba Huynh
*Assistant Examiner*—Cuong T. Thai
(74) *Attorney, Agent, or Firm*—Frommer Lawrence & Haug LLP; William S. Frommer; Hans R. Mahr

(57) ABSTRACT

According to the present invention, when displaying a jog-dial window menu on a liquid crystal display, hierarchically-structured menu items are displayed with a hierarchy icon, thereby enabling the user to easily recognize whether or not that menu item is hierarchically structured and improving the operation of menu selection. Furthermore, scroll display of a character string indicating a menu item is performed in an identification frame, thereby enabling the user to read the entire character string from beginning to end for easy recognition thereof and improving the operation of menu selection. Still further, a character string of a menu selected from among a plurality of menu items is displayed in a different color from other character strings, thereby enabling the user to easily recognize the selected menu item and improving the operation of menu selection.

3 Claims, 38 Drawing Sheets

IN CASE OF RIGHT-ROTATION (ARROW A DIRECTION)

S30a

S30b

IN CASE OF LEFT-ROTATION (ARROW B DIRECTION)

S30a

S30b

INFORMATION PROCESSING APPARATUS, INFORMATION PROCESSING METHOD, AND PROGRAM STORAGE MEDIUM FOR CONTROLLING AND DISPLAYING A MENU

BACKGROUND OF THE INVENTION

1. Field of the Invention

The present invention relates to an information processing apparatus, information processing method, and program-storage medium, and more particularly, is suitably applied to a notebook type personal computer apparatus.

2. Description of the Related Art

In recent years, in operating systems such as Windows 98 (trademark) manufactured by Microsoft Corporation of the United States, that are used in personal computers (called "computers" below), by displaying on a desk top a task bar on which are displayed individual icons corresponding to individual application software items that have an active window, those task bar icons are provided to the user as visual clues just like buttons.

Here, active window means the window that is currently subject to manipulation while a plurality of windows are displayed.

Technology relating to the use of this kind of task bar has been disclosed in detail in Japanese Patent Laid-Open No. 8-255066, and will be described below by citing that specification. As well as giving the user information concerning the active window as a visual clue by means of an icon, the task bar can be used to switch display of the active window.

Also, the task bar is provided with a start menu button that enables user access to a menu for control of the program launcher (activation), document opening, system settings, and so forth.

As an example, the manipulation of the start menu button on the task bar will be described below in case of a computer apparatus provided with peripheral devices such as a mouse, keyboard, and video display, and a Central Processing Unit (CPU) that performs prescribed processing in accordance with the operating system.

The start menu button operates as a central location for access by the user to programs, documents, files, system settings, help information, and so forth, and functions as means for opening a start menu in which many menu items are listed for access.

This start menu contains a plurality of menu items such as "Programs," "Search," "Settings," and "Help," or the like. Of these, the menu item "Programs" allows access from the start menu to a hierarchically-displayed program menu, and that program menu contains a user-selectable plurality of menu items corresponding to a plurality of application programs and program groups.

Now, in a computer apparatus with such a configuration, it is necessary to repeat complex manipulations before the user selects and starts the desired application program from the start menu button on the task bar.

That is to say, the user first specifies the start menu button on the task bar with the mouse cursor and clicks the left mouse button, whereupon the CPU displays the start menu. The user then specifies the "Program" menu item in the start menu with the mouse cursor and clicks the left mouse button, whereupon the CPU displays the program menu, which is a sub-menu of the start menu.

Next, the user specifies the desired application program menu item in the program menu with the mouse cursor and clicks the left mouse button, whereupon the CPU starts the application program corresponding to the specified menu item.

If the user specifies an application program group at this time, a sub-menu corresponding to that application program group is displayed by the CPU, requiring further specification with the mouse cursor and clicking of the left mouse button.

As the menus are hierarchically structured in this way, the user must frequently repeat specification with the mouse cursor and clicking of the left mouse button before the desired application program is started.

Since the menu items displayed in the menus here do not include visual clues indicating to the user that a menu is hierarchically structured, there is a problem in that it is difficult for the user to know whether a lower-level sub-menu exists before actually selecting a menu item, and the menu structure cannot easily be recognized.

Furthermore, in a computer apparatus with such a configuration, there are restrictions on the size of the display areas for displaying menu items displayed in the start menu, and menu items of a program menu hierarchically displayed from the start menu, and there is also a limit on the number of menu item characters that can be displayed at one time.

Accordingly, there is thus a problem in that, if the character string does not fit into the display area when displaying a menu item character string, the computer apparatus cannot display the entire character string, and consequently menu item recognition becomes difficult for a user, and it is easy to make mistakes in selection.

Still further, in a computer apparatus with such a configuration, when the user's desired menu item is selected from within a sub-menu corresponding to an application program group, and the application program corresponding to that menu item is started up, when a menu item is selected by the user, the display of the sub-menu containing that menu item is erased.

There is thus a problem in that, if the user forgets what the currently selected application program is, it is not possible to recognize what the currently selected application program is on the spot and rapidly.

Also, if the user switches the object of selection from the currently selected application program within an application program group to another application program, there is a problem of poor operability, in that a sub-menu must be displayed by again executing a series of operations from start menu selection to selection of a menu item corresponding to an application program group.

SUMMARY OF THE INVENTION

In view of the foregoing, an object of this invention is to provide an information processing apparatus, information processing method, and program storage medium with excellent user-friendliness that are capable of highly improving recognizing and operating of a menu.

The foregoing object and other objects of the invention have been achieved by the provision of an information processing apparatus, information processing method, and program storage medium, wherein, when a predetermined menu is displayed on a display screen, a display form of a menu is changed according to the attributes of said menu displayed. This enables a user to improve in recognition and operation of the menu.

Furthermore, in the present invention a prescribed menu is displayed on a display screen, and an icon indicating for hierarchically-structured menu items within that displayed menu that they are hierarchically structured is displayed together with the menu items on the display screen, thereby enabling the user easily to recognize, at the point in time at which a menu item is displayed, whether that menu item is hierarchically structured.

Still further, in the present invention a prescribed menu is displayed on a display screen, and the character string indicating a menu item of that displayed menu is scroll-displayed, so that even if the character string indicating a menu item does not fit into a limited display area, the user can read the entire character string from beginning to end by means of scroll display, and so recognize it.

Further yet, in the present invention a prescribed menu is displayed on a display screen, any of a plurality of menu items is selected from that displayed menu, and that selected menu item is displayed changed to a prescribed display state, thereby enabling the user to recognize the currently selected menu item easily, simply by having the user confirm the menu item for which the display state has changed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Configuration of Notebook Type Personal Computer with Jog-Dial

Figure 1:
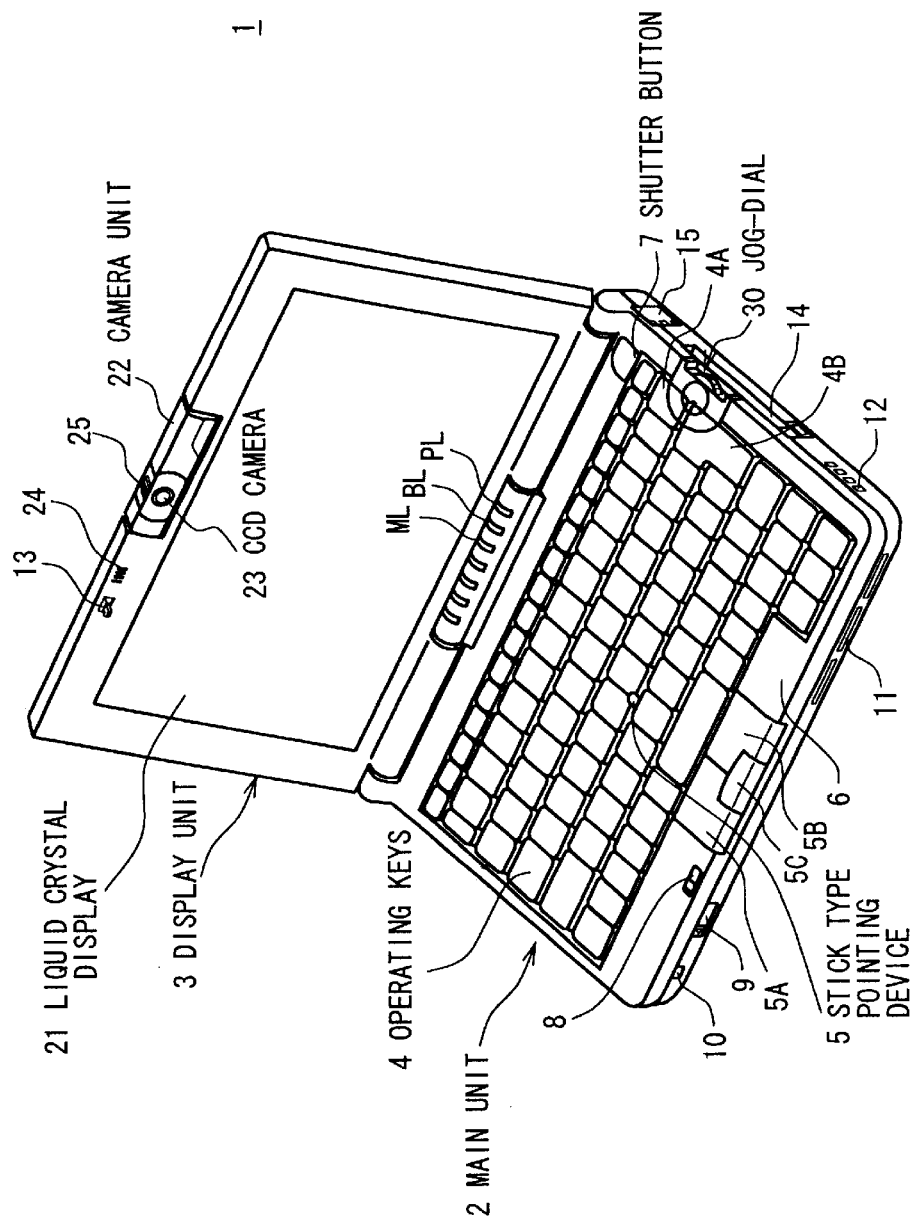
FIG. 1 is an abbreviated line drawing showing an overall configuration of a notebook type personal computer with jog-dial according to the present invention.

In FIG. 1, reference numeral 1 denotes a notebook type personal computer with a jog-dial (called "notebook personal computer with jog-dial" below) configuring the overall information processing apparatus of the present invention, configured by a main unit 2 and a display unit 3 attached to that main unit 2 so that it can be opened and closed freely.

The main unit 2 is equipped on its upper surface with a plurality of operating keys 4 for inputting various characters, symbols, digits, etc., a stick type pointing device (called simply "stick" below) 5 that is used to move the mouse cursor, a left click button 5A and right click button 5B corresponding to the left button and right button of an ordinary mouse, a center button 5C for manipulating the scroll bar without aligning the mouse cursor with the scroll button, a built-in speaker 6, and a shutter button 7 for a Charge Coupled Device (CCD) camera 23 installed on the display unit 3.

The front of the display unit 3 is provided with a Liquid Crystal Display (LCD) 21, and at the top center of the front of the display unit 3, a camera unit 22 equipped with the CCD camera 23 is installed so that it is free to rotate relative to the display unit 3.

That is to say, the camera unit 22 can be positioned in an arbitrary position by being rotated within an angular range of 180 degrees from the front direction to the rear direction of the display unit 3. Also, the camera unit 22 is provided with an adjustment ring 25 that performs focus adjustment of the CCD camera 23, and focus adjustment when photographing the desired photographic subject by means of that CCD camera 23 can easily be performed by rotating the adjustment ring 25.

Also, the display unit 3 is provided with a microphone 24 to the left of and close the camera unit 22, and sound can also be picked up from the rear of the display unit 3 via this microphone 24.

Further, the display unit 3 is provided with a catch 13 to the left of and close to the microphone 24, and a recess 8 is provided at a prescribed position on the main unit 2 corresponding to this catch 13, so that when the display unit 3 is closed against the main unit 2, the catch 13 engages in the recess 8 and locks.

The front of the main unit 2 is provided with a slide lever 9, and by sliding this slide lever 9, the catch 13 engaged in the recess 8 is unlocked, and the display unit 3 can be unfolded from the main unit 2. The front of the main unit 2 is also provided with a plurality of air intake holes 11.

The right side of the main unit 2 is provided with air outlet holes 12, a Personal Computer (PC) card slot 14 for a Personal Computer Memory Card International Association (PCMCIA) standard PC card, and a modular jack modem terminal 15.

Figure 2:
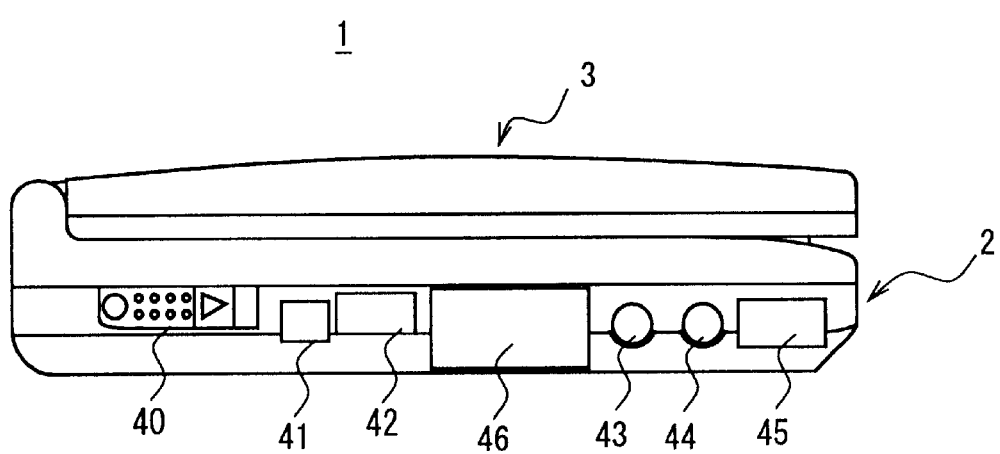
FIG. 2 is a side-view drawing showing the configuration of a left side of a main unit.

As shown in FIG. 2, the left side of the main unit 2 is provided with a sliding power switch 40, a 4-pin institute of Electrical and Electronics Engineers (IEEE) 1394 terminal 41, a Universal Serial Bus (USB) terminal 42, an external display connector 46, a microphone input terminal 43, a headphone terminal 44, and an Infrared Data Association (IrDA) compliant infrared port 45.

Figure 3:
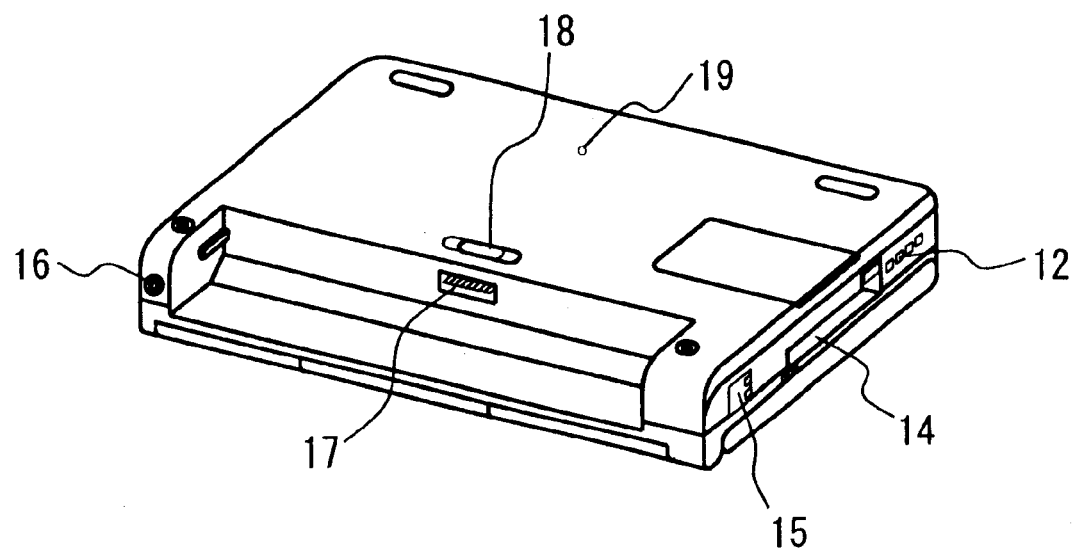
FIG. 3 is an abbreviated line drawing showing the configuration of a rear side and underside of the main unit.

As shown in FIG. 3, the rear side of the main unit 2 is provided with an external power supply connector 16, and the underside is provided with a sliding removal lever 18 for removing the battery pack (not shown), and a reset switch 19 for interrupting operation and reconfiguring the power-on-time environment. The battery pack is connected to a battery connector 17 so that it can be inserted and removed freely.

In addition to such a configuration, on the right side of the top of the main unit 2 (FIG. 1), between an operating key 4A corresponding to the Backspace key and an operating key 4B corresponding to the Enter key, a jog-dial 30 is incorporated so that it is of the same height as these operating keys 4A and 4B.

Here, the jog-dial 30 is a user interface with excellent operability that enables easy implementation of system settings and various functions in various kinds of application software by means of rotational manipulation and pushing manipulation of the dial.

Figure 4:
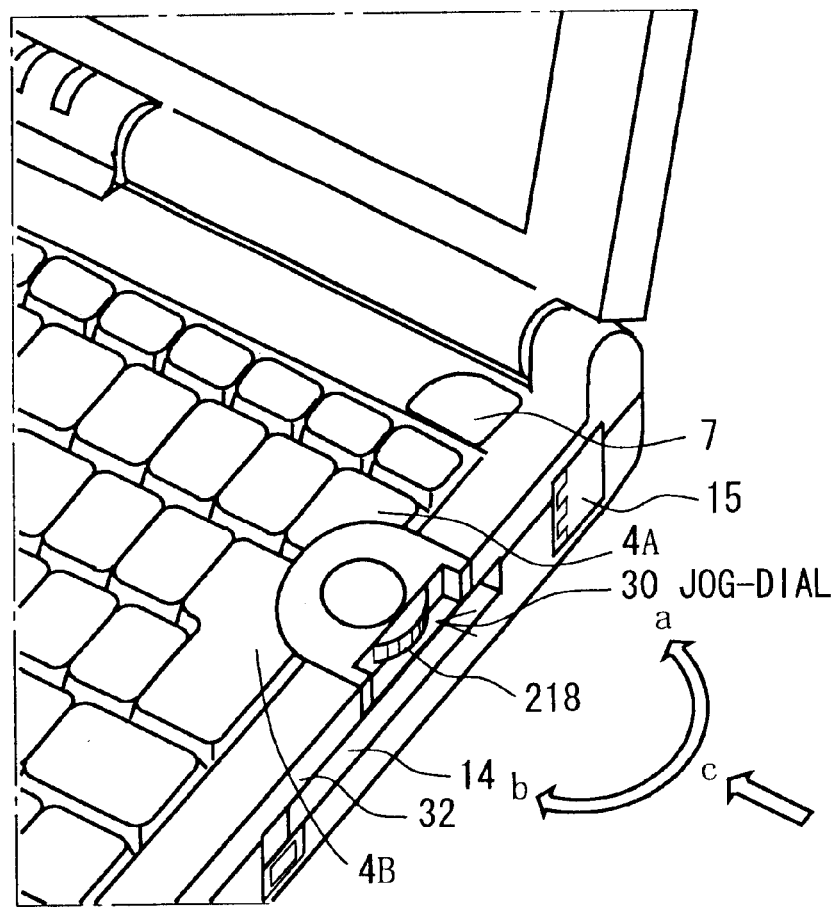
FIG. 4 is an abbreviated line drawing showing the appearance of the jog-dial installed on the main unit.

As shown in FIG. 4, this jog-dial 30 is installed so that a knurled disk-shaped operating dial 218 protrudes slightly from the outer case 32 of the main unit 2, and prescribed processing is executed in response to rotation of the disk-shaped operating dial 218 in the direction of arrow a or the direction of arrow b, together with which prescribed processing is executed in response to pushing in the direction of arrow c.

(1-1) Constitution of Jog-dial

Figure 5:
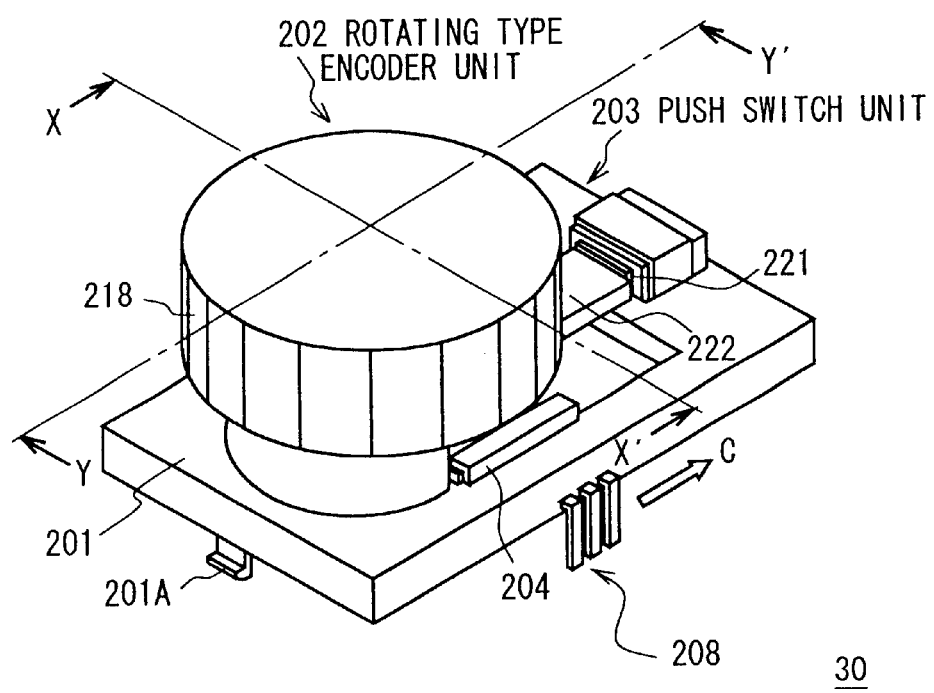
FIG. 5 is an abbreviated line drawing showing the overall configuration of the jog-dial.

Next, the constitution of the jog-dial 30 will be described in detail using FIGS. 5 to 11. As shown in FIG. 5, the jog-dial 30 is configured by a rotating type encoder unit 202 as rotational manipulation means for enabling movement in the arrow c direction by means of user pushing manipulation, and a push switch unit 203 as pushing manipulation means fixed at that position, mounted on a contact mounting plate 201.

Figure 6:
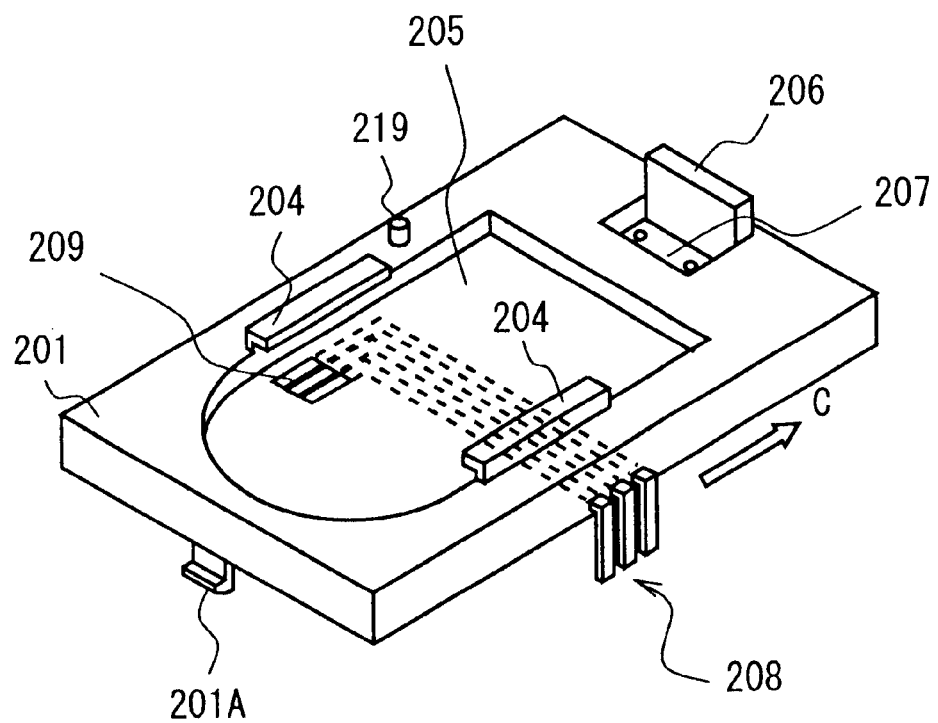
FIG. 6 is an abbreviated line drawing showing the configuration of a contact mounting plate.

As shown in FIG. 6, the contact mounting plate 201 is a slab-shaped molded resin entity, provided with a depression for movement 205 that has a movement guide rail section 204 for moving the rotating type encoder unit 202 (FIG. 5) in the arrow c direction provided on either side, and a stopping depression 207 provided with a stopping wall 206 that holds and secures the push switch unit 203, in addition to which conductive contact plates 209 connected to pins 208 for transmitting electrical signals from the rotating type encoder unit 202 to the outside are formed on the underside of the depression for movement 205.

Figure 7:
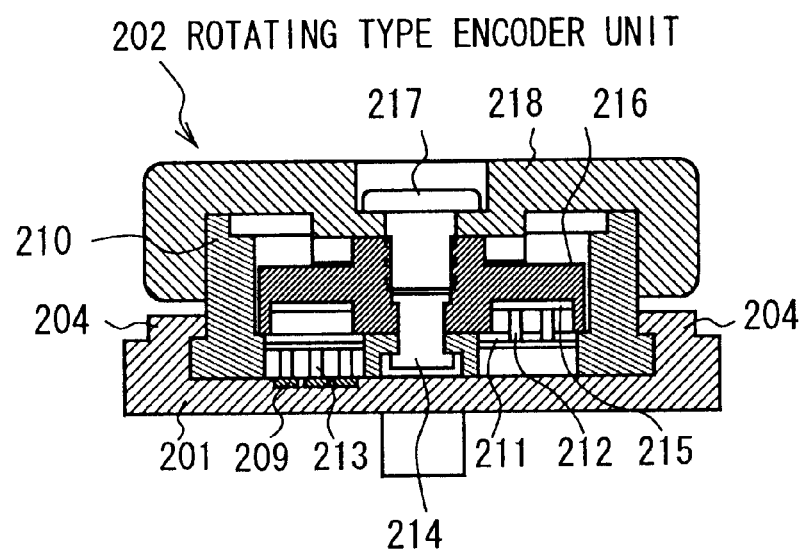
FIG. 7 is an abbreviated cross-sectional drawing showing the internal structure of the jog-dial (1)
Figure 8:
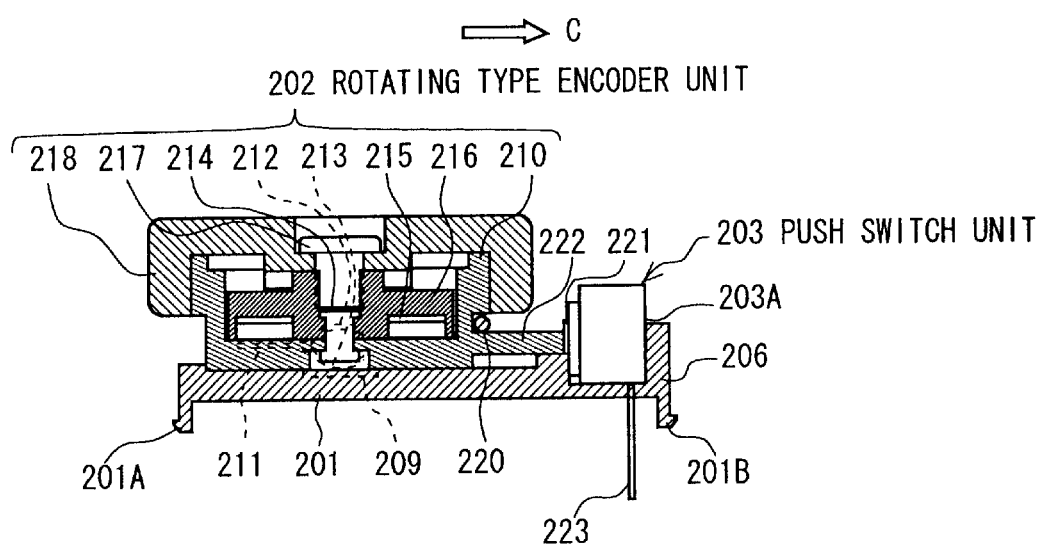
FIG. 8 is an abbreviated cross-sectional drawing showing the internal structure of the jog-dial (2)

As shown in FIG. 7, which shows a cross section through line X–X' of the jog-dial 30 in FIG. 5, and FIG. 8, which shows a cross section through line Y–Y', the rotating type encoder unit 202 is configured by a molded-resin box-type case 210 supported by the contact mounting plate 201 so as to be able to move within a fixed range in the arrow c direction via the guide rails 204 while fitted into the depression for movement 205 of the contact mounting plate 201; elastic contact feet 212 and 213 above and below an elastic contact entity 211 installed by insert-molding in the underside of the box-type case 210; a molded-resin rotating entity 216 that has radial contact plates 215 arranged so that they are supported in a rotatable fashion by a cylindrical spindle 214 integrally formed in the center of the box-type case 210 and at the same time flexibly contact the elastic contact foot 212 in disk form; and a circumferential-manipulation type disk-shaped operating dial 218 fitted to the rotating entity 216 with a screw 217 for user rotational manipulation.

With the rotating type encoder unit 202 with this kind of configuration, by means of a torsion coil spring 220 (FIGS. 8 to 11) positioned by means of a pin-shaped projection 219 provided at a prescribed position on the contact mounting plate 201 (FIG. 6), the box-type case 210 attached to the inner circumference of the disk-shaped operating dial 218 is moved in the opposite direction from the arrow c direction (i.e. in the direction away from the push switch unit 203), together with which the elastic contact foot 213 projecting from the underside of the box-type case 210 is brought into flexible contact with a conductive contact plate 209 of the contact mounting plate 201.

The push switch unit 203 (FIG. 8) is installed in a position in which the operating button 221 is opposite the rotating type encoder unit 202, and is fixed by being fitted into the stopping depression 207 of the contact mounting plate 201 such that the rear surface 203A abuts the stopping wall 206. At this time, the rotating type encoder unit 202 is in a state in which the box-type case 210 and integrally formed drive projection 222 abut the front of the operating button 221 of the push switch unit 203.

Figure 9:
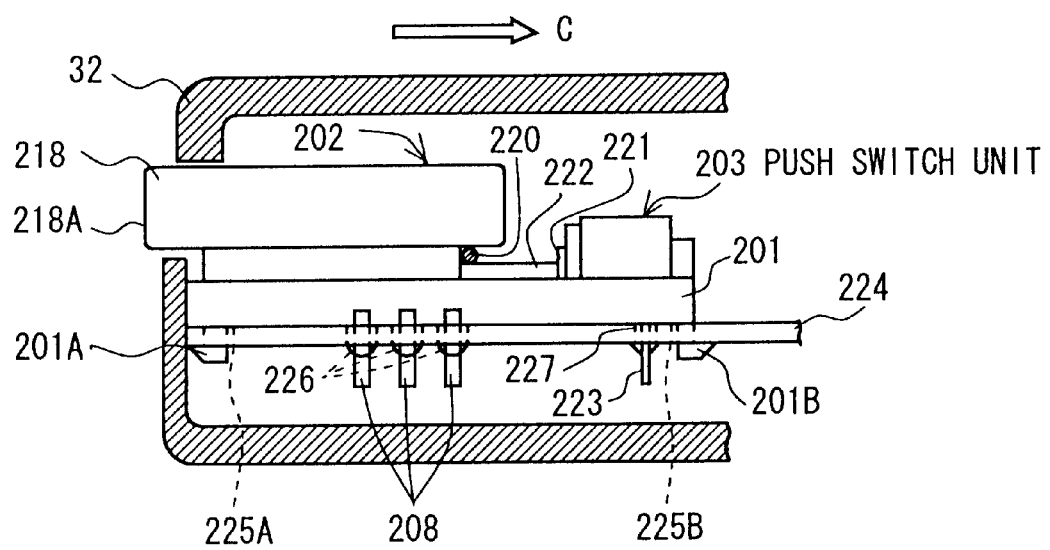
FIG. 9 is an abbreviated cross-sectional drawing showing the jog-dial installed.

When a jog-dial 30 of this kind is actually installed in an electronic device, as shown in FIG. 9 the pins 201A and 201B provided on the underside of the contact mounting plate 201, the connecting pin 208 of the rotating type encoder unit 202, and the connecting pin 223 of the push switch unit 203, are inserted in mounting holes 225A, 225B, 226, and 227 in the printed wiring board 224 of the electronic device, and connected by being soldered in that state.

By installing the jog-dial 30 at this time so that the disk-shaped operating dial 218 of the rotating type encoder unit 202 projects slightly from the outer case 32 of the main unit 2, the user can easily manipulate the circumferential surface 218A of the projecting disk-shaped operating dial 218 by sliding a finger along the outer case 32 (FIG. 4). The disk-shaped operating dial 218 can be made thin, as long as rigidity is maintained, allowing full provision for a slim main unit 2.

Figure 10:
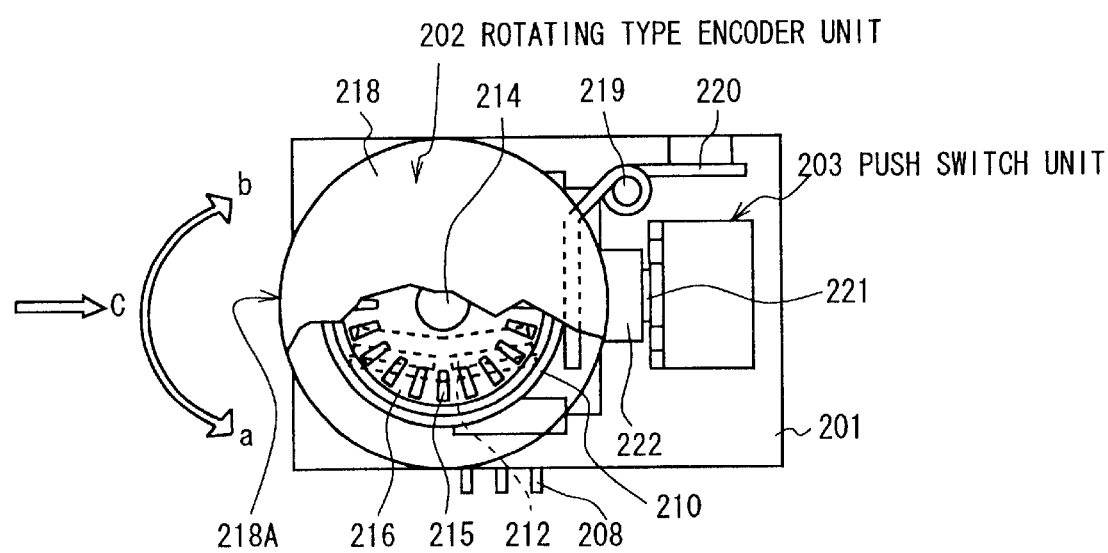
FIG. 10 is an abbreviated line drawing accompanying the description of an operation of a rotating type encoder unit.

Next, the operation of the jog-dial 30 will be described using FIGS. 10 and 11. The jog-dial 30 is so configured that when a force is applied tangentially (in the arrow a direction or arrow b direction) to the circumferential surface 218A of the disk-shaped operating dial 218 in the rotating type encoder unit 202 as shown in FIG. 10, the rotating entity 216 rotates about the cylindrical spindle 214 in the center of the box-type case 210, and the elastic contact foot 212 slides over and flexibly contacts a plurality of radial contact plates 215, whereby pulse signals coupled to the rotational manipulation of the disk-shaped operating dial 218 are generated.

The jog-dial 30 then transmits the generated pulse signals from elastic contact foot 212 (FIG. 7, FIG. 8) to elastic contact foot 213 via the elastic contact entity 211, and after being transmitted to the conductive contact plate 209 of the contact mounting plate 201 flexibly contacted by that elastic contact foot 213, these signals are transmitted to the circuitry of the printed wiring board 224 in the notebook type personal computer 1 via the pin for external connection 208 (FIG. 9).

Figure 11:
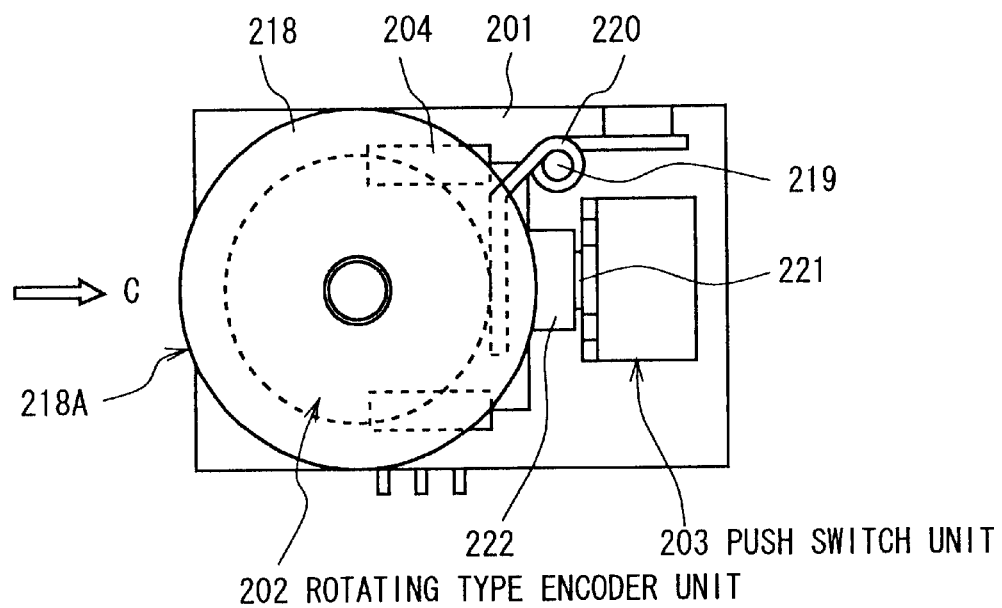
FIG. 11 is an abbreviated line drawing accompanying the description of an operation of a push switch unit.

By applying to circumferential surface 218A of the disk-shaped operating dial 218, in the arrow c direction, a pushing force opposite to the force of the torsion coil spring 220 attached to the contact mounting plate 201, as shown in FIG. 11, and moving the entire rotating type encoder unit 202 along the guide rails 204 of the contact mounting plate 201, the jog-dial 30 pushes the drive projection 222 integrally formed with the box-type case 210 by means of the operating button 221, and turns on the push switch unit 203.

By this means, the jog-dial 30 transmits to the circuitry of the printed wiring board 224 in the notebook type personal computer 1, via the connecting pin 223 (FIG. 8 and FIG. 9), the pushing-manipulation signal generated by turning on the push switch unit 203.

The jog-dial 30 is so configured that when the pushing force being applied to the circumferential surface 218A of the disk-shaped operating dial 218 is released, the rotating type encoder unit 202 is pushed back in the direction opposite to the arrow c direction by the return force of the torsion coil spring 220 attached to the contact mounting plate 201, and restored to 1its original state.

(1-2) Circuit Constitution of Notebook Type Personal Computer with Jog-dial

Figure 12:
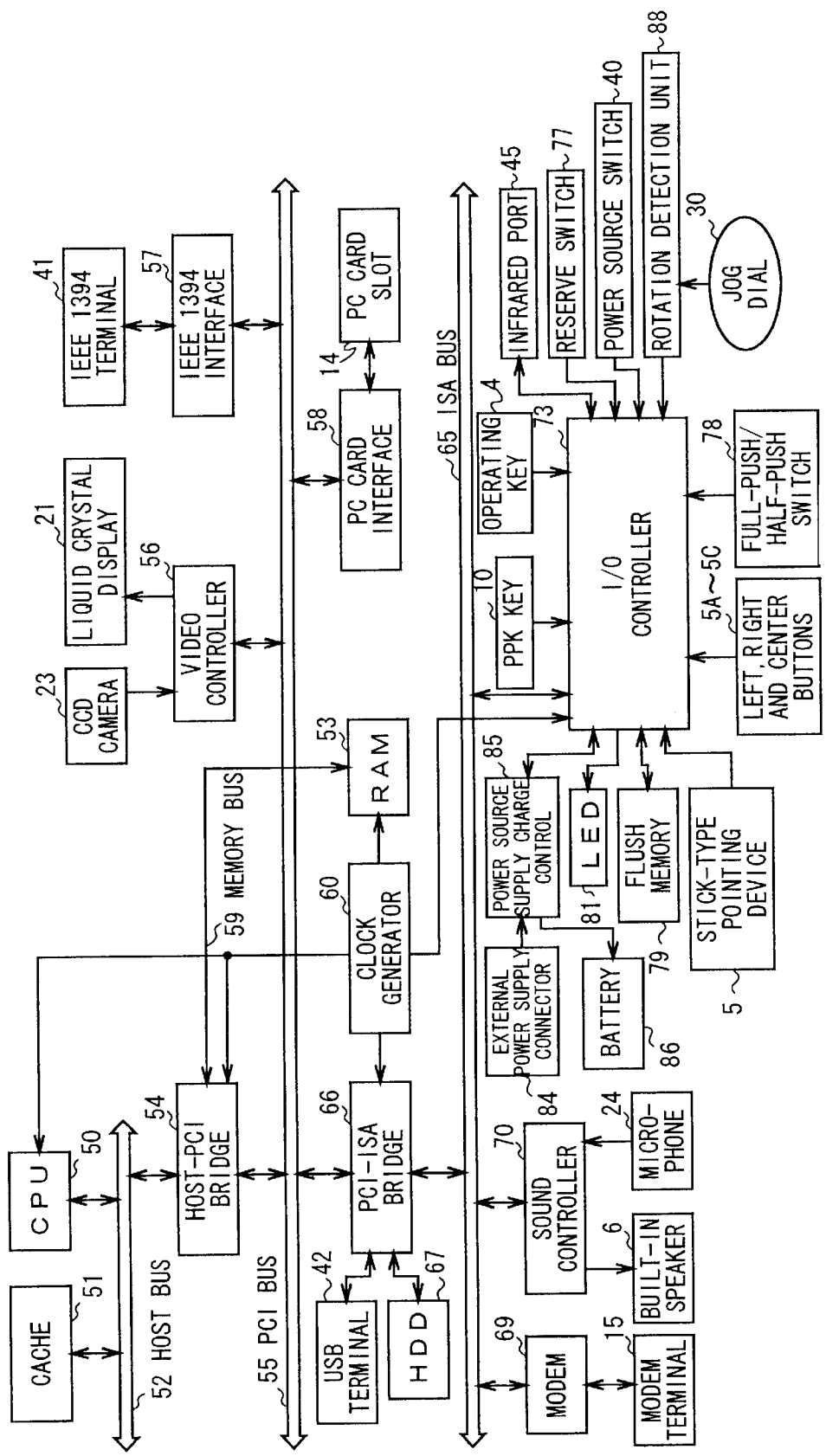
FIG. 12 is a block diagram showing a circuit configuration of the notebook type personal computer with jog-dial.

As shown in FIG. 12, in the main unit 2 of the notebook type personal computer 1, a Central Processing Unit (CPU) 50 that performs integrated control of various functions in the main unit 2 is connected to a host bus 52, and various functions can be implemented by executing processing corresponding to various kinds of programs and application software loaded into Random Access Memory (RAM) 53 by means of that CPU 50 at the prescribed operating speed based on a system clock supplied by a clock generator 60.

In addition, cache memory 51 is connected to the host bus 52, and data used by the CPU 50 is cached, enabling high-speed access to be achieved.

The host bus 52 is connected to a Peripheral Component Interconnect (PCI) bus 55 via a host-PCI bridge 54, and a video controller 56, an Institute of Electrical and Electronics Engineers (IEEE) 1394 interface 57, video capture processing chip 83, and Personal Computer (PC) card interface 58 are connected to this PCI bus 55.

The host-PCI bridge 54 controls the exchange of various kinds of data performed between the CPU 50, and the video controller 56, the video capture processing chip 83, the IEEE 1394 interface 57 and the PC card interface 58, and also performs memory control for the RAM 53 connected via a memory bus 59.

The host-PCI bridge 54 is connected to a video controller 56 via a signal line through an Accelerated Graphics Port (AGP), enabling high-speed transfer of image data to/from the host-PCI bridge 54 and video controller 56.

The video capture processing chip 83 is connected to an I$^2$C bus 82 (also generally called an System Management (SM) bus), which is a serial bus, and is so configured that when image data photographed by the Charge Coupled Device (CCD) camera 23 is supplied via this I$^2$C bus 82, it is initially stored in built-in frame memory (not shown), and after JPEG image data is generated by executing image compression processing in accordance with the Joint Photographic Experts Group (JPEG) standard, that JPEG image data is stored in the frame memory again.

Then, after directly transferring JPEG image data stored in the frame memory to the RAM 53 using the bus master function in response to a request from the CPU 50, the video capture processing chip 83 transfers data to a hard disk drive (HDD) 67 as JPEG image (still image) data or MotionJPEG image (moving image) data.

The video controller 56 executes the prescribed graphics processing for image data photographed by the Charge Coupled Device (CCD) camera 23 or JPEG image data of the video capture processing chip 83, and then stores the data in the built-in Video Random Access Memory (VRAM), reads it as appropriate, and outputs it to the liquid crystal display 21 for display.

Also, the video controller 56 can display a plurality of window screens by outputting image data to the liquid crystal display 21 based on various kinds of application software supplied in a timely fashion.

The PC card interface 58 is connected as appropriate via a PC card when an optional function is added, and enables connection to an external device such as a CD-ROM drive or DVD drive, for example, via a PC card.

The IEEE 1394 interface 57 is directly connected to the IEEE 1394 terminal 41, and connection to an external device such as another computer apparatus or digital video camera is possible via this IEEE 1394 terminal 41.

The PCI bus 55 is connected to an Industrial Standard Architecture (ISA) bus 65 via a PCI-ISA bridge 66, and the HDD 67 and Universal Serial Bus (USB) terminal 42 are connected via this PCI-ISA bridge 66.

Here, the PCI-ISA bridge 66 is configured by an Integrated Drive Electronics (IDE) interface, configuration register, Real-Time Clock (RTC) circuit, USB interface, etc., and performs control of the HDD 67 via the IDE interface based on the system clock supplied from the clock generator 60.

On the hard disk of the HDD 67 are stored an Operating System (OS) such as Windows 98 (trademark), an e-mail program, auto-pilot program, jog-dial utility program, jog-dial driver, capture software, and digital map software, and also various other kinds of application software, which are transferred to the RAM 53 in a timely fashion as start-up processing progresses.

The PCI-ISA bridge 66 controls, via the USB interface, external devices such as a floppy disk drive, printer, and USB mouse (not shown) connected via the USB terminal 42, and also performs control of a modem 69 and sound controller 70 connected to the ISA bus 65.

The modem 69 connects to an Internet service provider (called "provider" below) via a public telephone line (not shown) or the Internet from a modem terminal 15, and allows access to and from that provider. The sound controller 70 captures speech signals from the microphone 24 and supplies speech signals to the built-in speaker 6.

To the ISA bus 65 is connected an In/Out (I/O) controller 73 that receives a power supply from an external power supply connector 84 via a power supply charge control circuit 85 and performs power supply to the circuits when the power supply switch 40 is turned on. Here too, the I/O controller 73 operates based on the system clock supplied from the clock generator 60.

In addition, the power supply charge control circuit 85 is controlled by the I/O controller 73, and controls charging of a battery pack 86 connected to the battery connector 17 (FIG. 3).

This I/O controller 73 is configured by a microcontroller, I/O interface, CPU, ROM, RAM, and so forth, and controls data input/output between the OS or application software and various peripheral devices such as the liquid crystal display 21 and HDD 67 on the basis of the Basic Input/Output System (BIOS) stored in flash memory 79.

The I/O controller 73 is connected to an infrared port 45, enabling infrared communication with another computer apparatus to be executed, for example. The I/O controller 73 is also connected to a reverse switch 77, and when the camera unit 22 of the CCD camera 23 is rotated through 180 degrees toward the rear of the liquid crystal display 21, the reverse switch 77 is turned on and this fact is reported to the CPU 50 via the PCI-ISA bridge 66 and host-PCI bridge 54.

In addition, the I/O controller 73 is connected to a full-depression/semi-depression switch 78; when the shutter button 7 provided on the top of the main unit 2 is in the semi-depressed state, the full-depression/semi-depression switch 78 is turned on and the CPU 50 is notified of this fact, and when the shutter button 7 is in the fully-depressed state, the full-depression/semi-depression switch 78 is turned on and the CPU 50 is notified of this fact.

That is to say, if the user places the shutter button 7 in the semi-depressed state when the capture software has been started up in the RAM 53 from the hard disk of the HDD 67, the CPU 50 enters still image mode, controls the CCD camera 23, and executes a still image freeze, and when the fully-depressed state is established, captures the frozen still image data and sends it to the video controller 56.

On the other hand, if the user places the shutter button 7 in the fully-depressed state when the capture software has not been started up, the CPU 50 enters moving image mode, captures a maximum of around 60 seconds of moving images, and sends them to the video controller 56.

The ROM of the I/O controller 73 stores a wake-up program, key input monitor program, LED control program, jog-dial status monitor program, and various other control programs.

The jog-dial status monitor program here is a program related to the jog-dial status utility program stored in the hard disk of the HDD 67, and is used to monitor whether the rotating type encoder unit 202 of the jog-dial 30 has been rotated or pushed.

The wake-up program is a program controlled so that the prescribed processing is executed by the CPU 50 when the current time supplied from the RTC circuit in the PCI-ISA bridge 66 reaches the pre-set start time, and the key input monitor program is a program that monitors input from the operating keys 4 and various other key switches.

The LED control program is a program that controls the illumination of various Light Emitting Diode (LED) lamps such as the power lamp PL, battery lamp BL, and message lamp ML.

The RAM of the I/O controller 73 is provided with a set time register for the wake-up program, a key input monitor register for the key input monitor program, an LED control register for the LED control program, an I/O register for the jog-dial status monitor program, and various other program registers.

The set time register stores start-time time information set arbitrarily beforehand by the user for use by the wake-up program. Thus, the I/O controller 73 judges whether the current time supplied from the RTC circuit has reached the arbitrarily set start time, on the basis of the wake-up program, and when the start time is reached, notifies the CPU 50 of the fact. By this means the CPU 50 starts up the pre-set prescribed application software when the start time arrives, and executes the prescribed processing according to that application software.

The key input monitor register stores operating key flags on the basis of input from the operating keys 4, stick 5, left click button 5A, right click button 5B, and center button 5C.

Thus, on the basis of the key input monitor program, the I/O controller 73 judges whether, for example, a pointing operation by means of the stick 5, or a click operation of the left click button 5A, right click button 5B, or center button 5C, has been performed, based on the operating key flag status, and when a pointing operation or click operation is performed, notifies the CPU 50 of the fact.

Here, a pointing operation is an operation that moves the mouse cursor to the desired position by pushing the stick 5 up, down, to the left, or to the right with a finger, and a click operation is the rapid pressing and releasing of the left click button 5A or the right click button 5B.

By this means, the CPU 50 executes the prescribed processing in accordance with mouse cursor movements by means of pointing operations, or click operations.

The LED control register stores illumination flags that indicate the illumination state of various LED lamps, such as the power lamp PL, battery lamp BL, and message lamp ML.

Thus, when the CPU 50 reads an e-mail program from the hard disk of the HDD 67 and starts it up in the RAM 53 in response to pushing manipulation of the jog-dial 30, for example, and receives e-mail according to that e-mail program, the I/O controller 73 stores an illumination flag, and illuminates the message lamp ML by controlling the LED 81 on the basis of that illumination flag.

The I/O register for the jog-dial status monitor program stores rotational manipulation flags and pushing manipulation flags corresponding respectively to rotational manipulation and pushing manipulation of the jog-dial 30.

Thus, when a menu item desired by the user is selected from a plurality of menu items by means of rotational manipulation and pushing manipulation of the jog-dial 30 connected via the rotation detecting unit 88, the I/O controller 73 stores a rotational manipulation flag and pushing manipulation flag in the I/O register, and notifies the CPU 50 to this effect.

By this means, the CPU 50 starts up the application software corresponding to the menu item determined by rotational manipulation and pushing manipulation of the jog-dial 30, according to a jog-dial utility program read from the HDD 67 and started up in the RAM 53, and executes the prescribed processing.

Here, even if the power switch 40 is off and the OS has not been started up, the I/O controller 73 operates normally on the basis of the jog-dial status monitor program under the control of the power supply charge control circuit 85, and the user's desired application software or script file can be started by pushing manipulation of the jog-dial 30 even in the power-save state or when power is off without the provision of a special key.

Incidentally, the I/O controller 73 is connected to the I²C bus 82, and by supplying, via the I²C bus 82, various setting parameters to the CCD camera 23 set by means of the operating keys 4 or the jog-dial 30, camera power supply on/off control is performed for the CCD camera 23, and CCD camera 23 brightness and contrast are adjusted.

Next, the operation of the I/O controller 73 based on the jog-dial status monitor program will be described using FIGS. 13 to 15.

Figure 13:
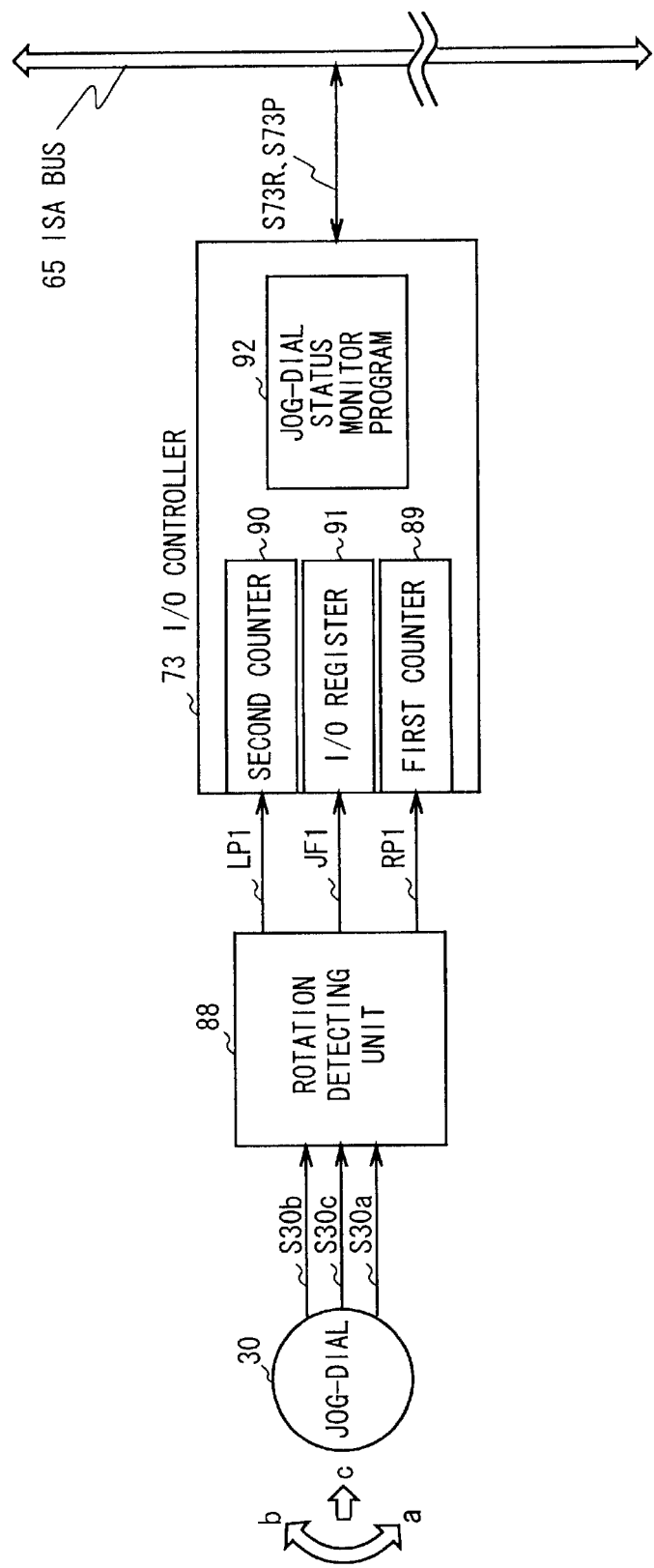
FIG. 13 is a block diagram accompanying the description of the detection of a rotational direction of the jog-dial.
Figure 14:
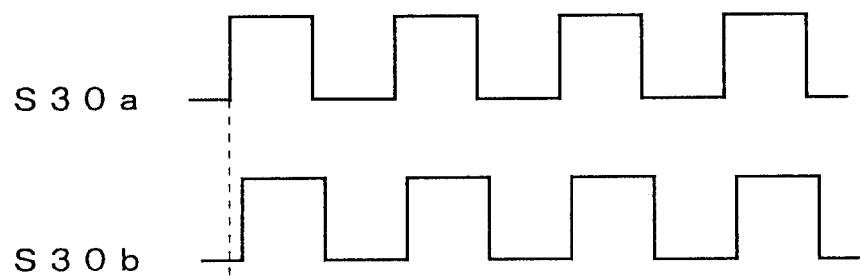
FIG. 14 comprises pulse waveform drawings accompanying the description of the detection of the rotational direction by a rotation detecting unit.
Figure 14:
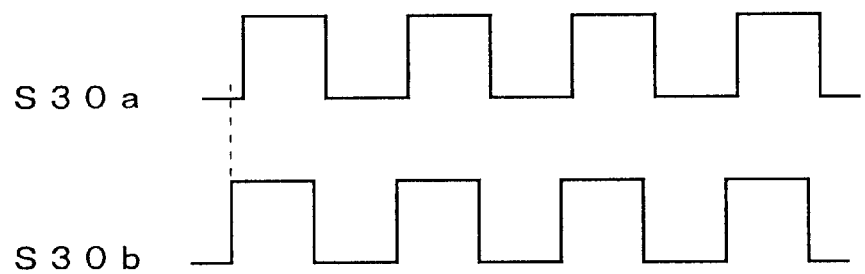

When the jog-dial 30 is rotated in either the arrow a or b direction (FIG. 4) as shown in FIG. 13, the jog-dial 30 outputs a rotational manipulation signal S30a or S30b, corresponding to right-rotation (arrow a direction) or left-rotation (arrow b direction), respectively, to the rotation detecting unit 88, as shown in FIG. 14, and when pushed in the arrow c direction, outputs a pushing manipulation signal S30c to the rotation detecting unit 88.

The rotation detecting unit 88 detects that the rotational direction of the jog-dial 30 is right-rotation (arrow a direction) or left-rotation (arrow b direction) on the basis of differences in the rise timing between the rotational manipulation signals S30a and S30b, and detects that the jog-dial 30 has been pushed on the basis of the pushing manipulation signal S30c.

When the rotation detecting unit 88 detects that the rotational direction of the jog-dial 30 is right-rotation, it supplies a right-rotation pulse RP1 to a first counter 89 of the I/O controller 73, and when it detects that the rotational direction of the jog-dial 30 is left-rotation, it supplies a left-rotation pulse LP1 to a second counter 90 of the I/O controller 73.

And when the rotation detecting unit 88 detects that the jog-dial 30 has been pushed on the basis of the pushing manipulation signal S30c, it stores a pushing manipulation flag JF1 in the I/O register 91.

By means of 5 ms-interval polling performed in accordance with the jog-dial status monitor program 92 stored in the ROM, the CPU of the I/O controller 73 detects the amount of rotational change of the jog-dial 30 on the basis of the difference between the right-rotation pulse RP1 count value according to first counter 89 and the left-rotation pulse LP1 count value according to the second counter 90, and also detects whether the rotating type encoder unit 202 has been pushed in the arrow c direction on the basis of the pushing manipulation flag JF1 stored in the I/O register 91.

Figure 15:
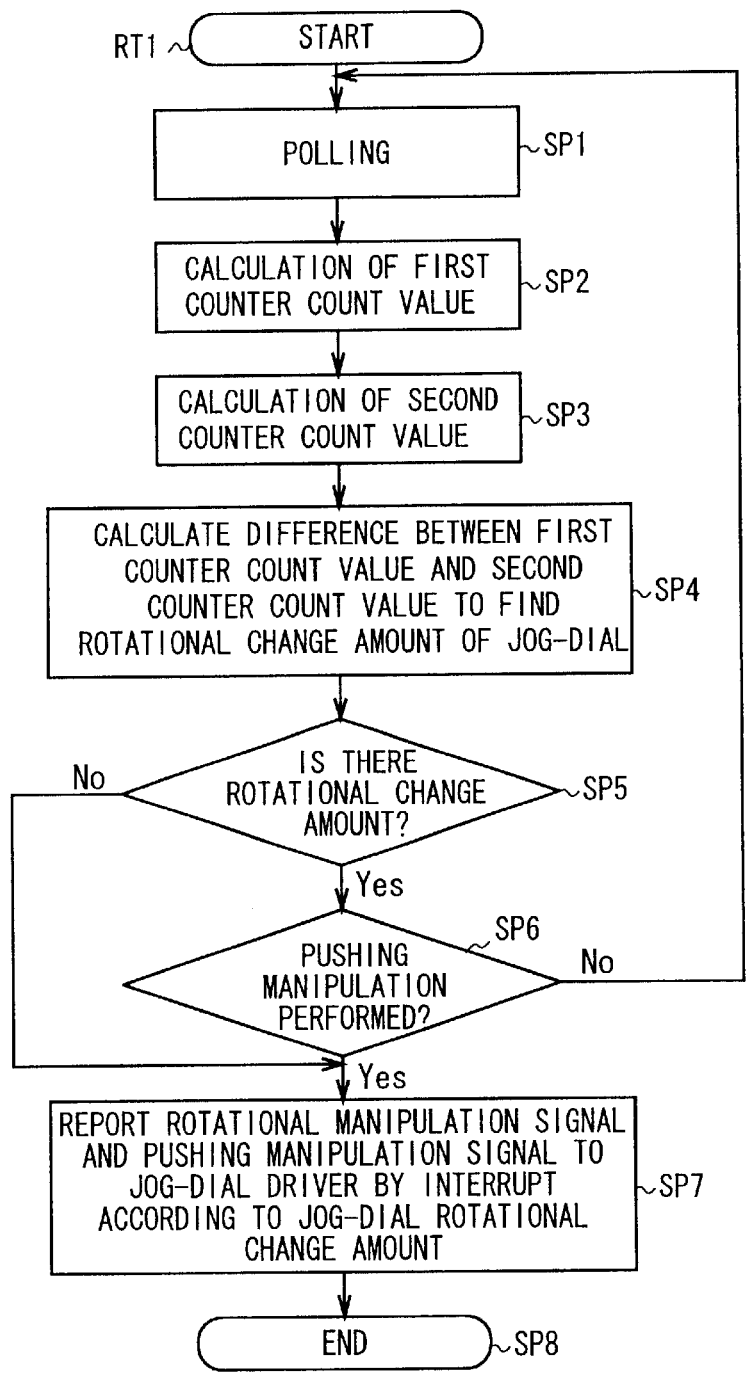
FIG. 15 is a flowchart showing an I/O controller processing procedure performed in accordance with a jog-dial status monitor program.

That is to say, as shown in FIG. 15, the CPU of the I/O controller 73 starts at the start step of routine RT1 and proceeds to step SP1. In step SP1, the CPU performs polling every 5 ms of the first counter 89, second counter 90, and I/O register 91 in accordance with the jog-dial status monitor program 92, and then proceeds to the next step SP2.

In step SP2, the CPU calculates the count value of the first counter 89 by subtracting from the count result of the first counter 89 at the current time (T) the count result of the first counter 89 at time (T−1), and then proceeds to the next step SP3.

In step SP3, the CPU calculates the count value of the second counter 90 by subtracting from the count result of the second counter 90 at the current time (T) the count result of the second counter 90 at time (T−1), and then proceeds to the next step SP4.

In step SP4, the CPU finds the amount of rotational change of the jog-dial 30 by calculating the difference between the count value of the first counter 89 and the count value of the second counter 90, and then proceeds to the next step SP5.

In step SP5, the CPU judges whether an amount of rotational change has occurred in the jog-dial 30. If a negative result is obtained here, this indicates that there is no rotational change in the jog-dial 30, and in this case the CPU proceeds to step SP7.

If, on the other hand, a positive result is obtained in step SP5, this indicates that rotational change has been transmitted to the jog-dial 30, and in this case the CPU proceeds to the next step SP6.

In step SP6, the CPU judges whether the jog-dial 30 has been pushed in the arrow c direction on the basis of the pushing manipulation flag JF1 stored in the I/O register 91. If a negative result is obtained here, this indicates that pushing manipulation of the jog-dial 30 has not been performed, and in this case the CPU goes back to step SP1 and repeats the above described processing.

If, on the other hand, a positive result is obtained in step SP6, this indicates that pushing manipulation of the jog-dial 30 has been performed, and in this case the CPU proceeds to the next step SP7.

In step SP7, since rotational change has been transmitted to the jog-dial 30, and pushing manipulation of the jog-dial 30 has also been performed, the CPU generates a rotational change signal S73R conforming to the rotational change amount of the jog-dial 30 and a pushing change signal S73P, reports this by interrupt to the CPU 50 via the jog-dial driver started up in the RAM 53 via the I/O register 91, then proceeds to the next step SP8 and terminates I/O controller 73 processing.

Figure 16:
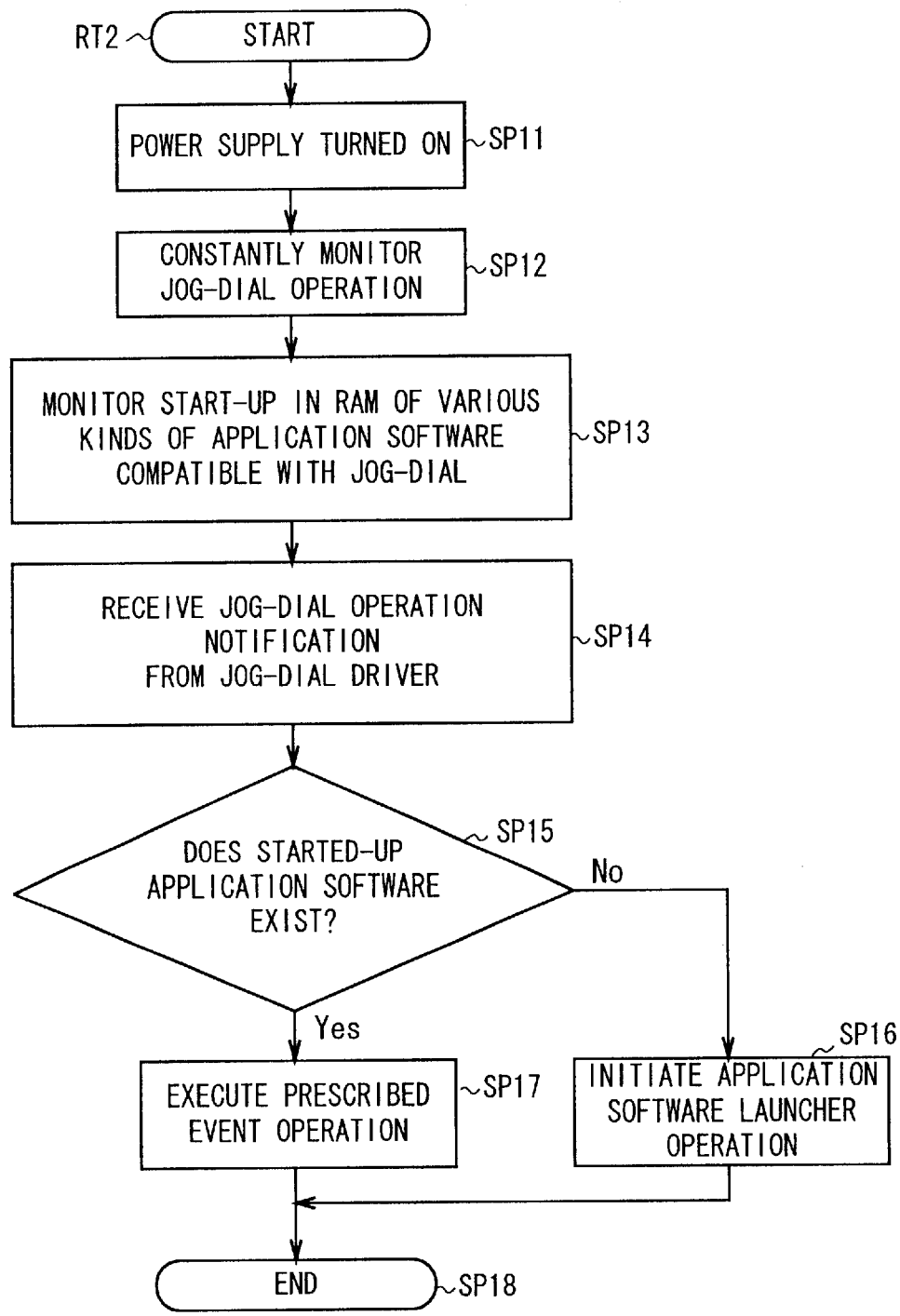
FIG. 16 is a flowchart showing the processing procedure according to an operation of the jog-dial when application software is started up and is not started up.

Next, the processing procedure performed by the CPU 50 in accordance with the jog-dial utility program started up in the RAM 53 from the HDD 67 will be described, using the flowchart in FIG. 16.

The CPU 50 first starts from the start step of routine RT2 and proceeds to step SP11. In step SP11, the CPU 50 receives via the I/O controller 73 notification that the power switch 40 has been turned on by the user, and then proceeds to the next step SP12.

In step SP12, the CPU 50 identifies the operating status of the jog-dial 30 by means of reception by the jog-dial driver from the I/O controller 73 of notification to the effect that the jog-dial 30 has been manipulated by the user, and then proceeds to the next step SP13.

In step SP13, the CPU 50 monitors the start-up in the RAM 53 of various kinds of application software that can be controlled by the jog-dial 30, and then proceeds to the next step SP14.

In step SP14, the CPU 50 receives notification of the operating status of the jog-dial 30 from the jog-dial driver started up in the RAM 53, and then proceeds to the next step SP15.

In step SP15, the CPU 50 judges whether various kinds of application software started up in the RAM 53 exist. If a negative result is obtained here, this indicates that started-up application software does not exist, and in this case the CPU 50 proceeds to the next step SP16.

In step SP16, the CPU 50 initiates launcher operation for various kinds of application software that have not been started up, and then proceeds to the next step SP18 and terminates processing.

The launcher operation here functions on the condition that currently started-up application software does not exist. By executing launcher operation on the basis of pushing manipulation of the jog-dial 30, the CPU 50 displays on the liquid crystal display 21 a jog-dial menu corresponding to a plurality of application software items recorded in the launcher list beforehand.

For example, if started-up application software does not exist, and the jog-dial 30 is pushed in the arrow c direction, the I/O controller 73 sends the rotational change signal S73R and pushing change signal S73P, indicating the operating status of the jog-dial 30, to the CPU 50 via the jog-dial driver.

Figure 17:
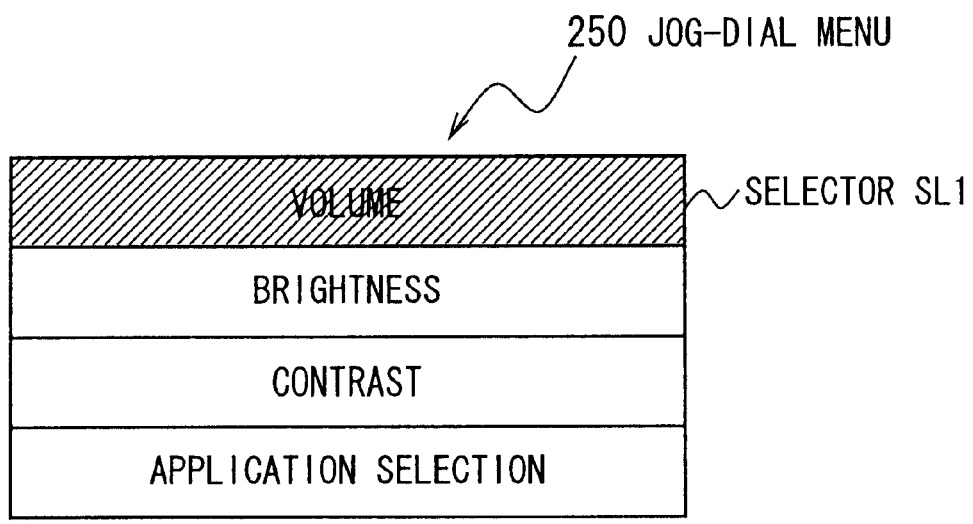
FIG. 17 is an abbreviated line drawing showing a jog-dial menu.

By this means, the CPU 50 starts up an application selection program, etc., that performs volume adjustment for the built-in speaker 6, brightness or contrast adjustment for the liquid crystal display 21, and application software selection, recorded beforehand in the launcher list, and displays a jog-dial menu 250 such as that shown in FIG. 17 on the liquid crystal display 21.

In this jog-dial menu 250, menu items ("Volume," "Brightness," "Contrast," and "Application Selection")are displayed, corresponding to processing for volume adjustment, brightness adjustment, contrast adjustment, and application software selection.

The highlighted area accentuated by reverse-display (hatched area) at this time is the currently selected selector SL1. By default, the menu is displayed with the selector SL1 positioned at the "Volume" menu item.

Then, when the user rotates the jog-dial 30 in the arrow a or b direction in order to move the selector SL1, the I/O controller 73 sends to the CPU 50, via the jog-dial driver started-up in the RAM 53, the jog-dial 30 rotational change signal S73R detected according to the jog-dial status monitor program 92.

Figure 18:
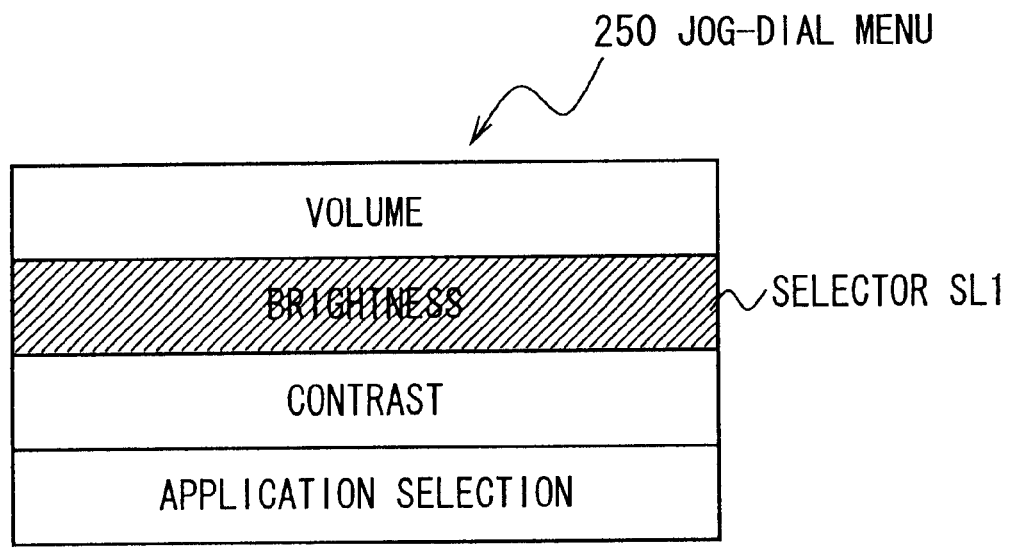
FIG. 18 is an abbreviated line drawing accompanying the description of selector movement (1)

By this means, the CPU 50 moves the selector SL1 to the user's desired menu item on the basis of the rotational change signal S73R. For example, when the jog-dial 30 is rotated by the user through the desired angle in the arrow b direction when the selector SL1 is positioned at the "Volume" menu item in the jog-dial menu 250 by default, the selector SL1 moves to the "Brightness" menu item as shown in FIG. 18.

Figure 19:
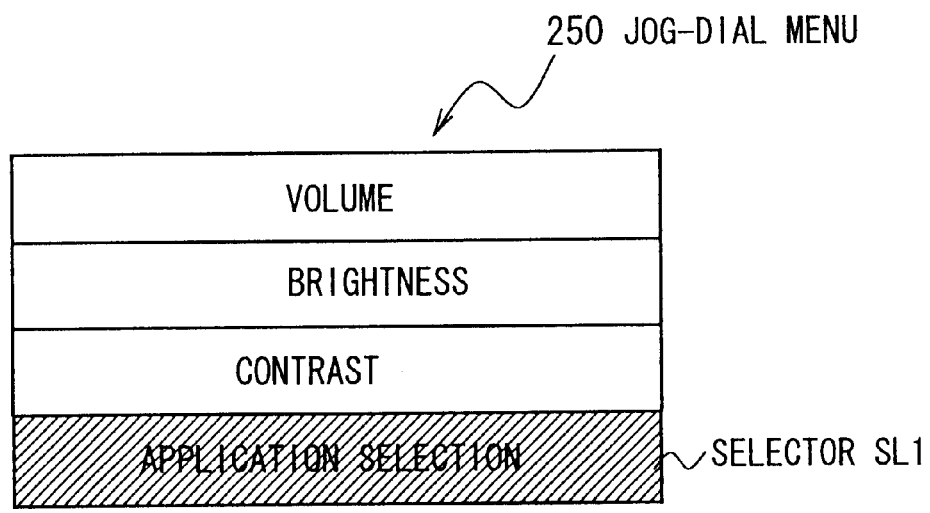
FIG. 19 is an abbreviated line drawing accompanying the description of selector movement (2)

Then, when the jog-dial 30 is rotated by the user through the desired angle in the arrow b direction, the selector SL1 moves to the "Application Selection" menu item as shown in FIG. 19.

Figure 20:
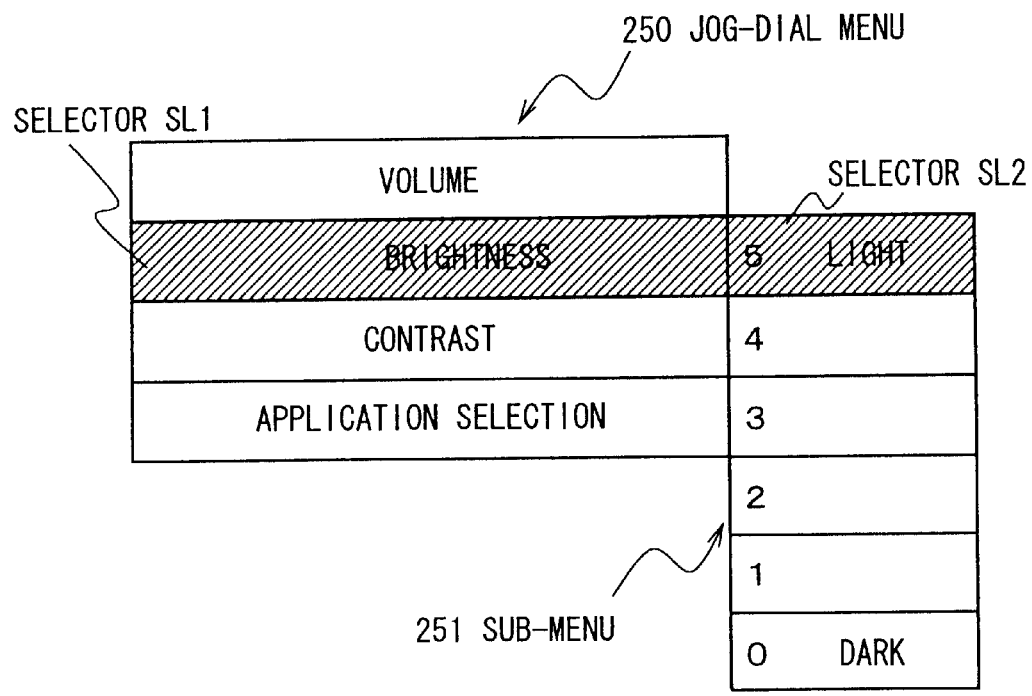
FIG. 20 is an abbreviated line drawing showing the sub-menu corresponding to "Brightness" according to pushing manipulation of the jog-dial.

When the jog-dial 30 is pushed in the arrow c direction by the user after the CPU 50 has moved the selector SL1 to the "Brightness" menu item desired by the user, for example, in accordance with rotational manipulation of the jog-dial 30 by the user, the CPU 50 displays a sub-menu 251 corresponding to the "Brightness" menu item as shown in FIG. 20.

In this sub-menu 251 are displayed six stages of sub-menu items, from sub-menu item "5" to be selected when setting brightness to the brightest level to sub-menu item "0" to be selected when setting brightness to the darkest level. By default, the sub-menu is displayed with the selector SL2 positioned at sub-menu item "5."

Then, when the user rotates the jog-dial 30 in the arrow b direction in order to move the selector SL2, the I/O controller 73 sends to the CPU 50, via the jog-dial driver started-up in the RAM 53, the rotational change signal S73R showing the operating status of the jog-dial 30 according to the jog-dial status monitor program 92.

By this means, the CPU 50 moves the selector SL2 to any one of menu items "5" to "0" as desired by the user on the basis of the rotational change signal S73R. Incidentally, the CPU 50 does not move the selector SL1 for the jog-dial menu 250 in response to rotational manipulation of the jog-dial 30 while the sub-menu 251 is currently being displayed.

Figure 21:
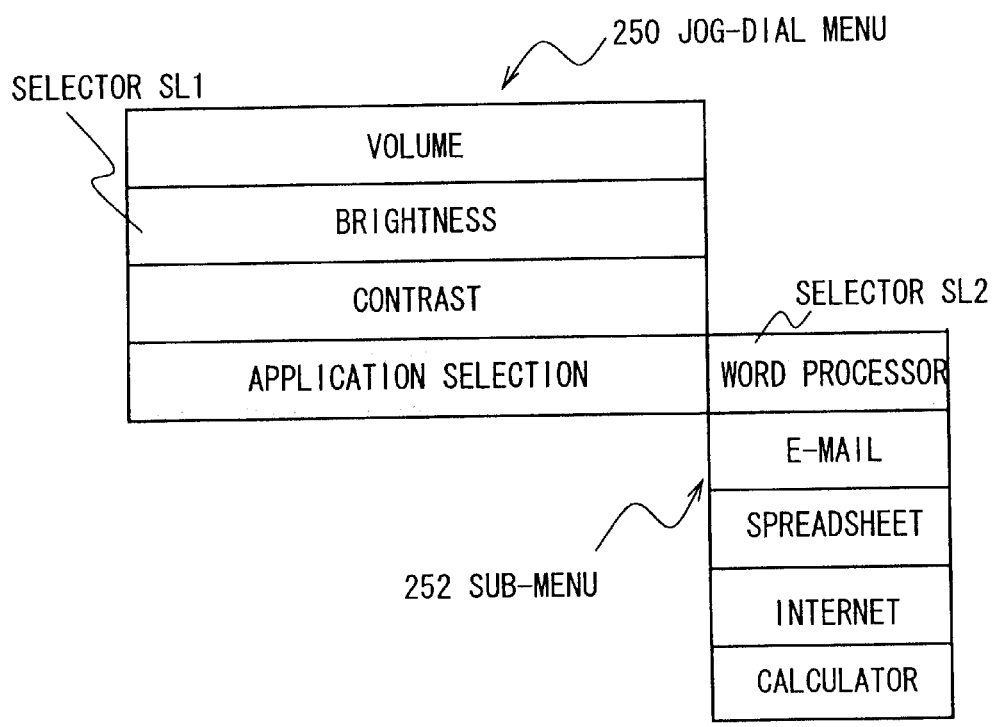
FIG. 21 is an abbreviated line drawing showing the sub-menu corresponding to "Application Selection" according to pushing manipulation of the jog-dial.

Now, if the jog-dial 30 is pushed by the user when the selector SL1 for the jog-dial menu 250 has been moved to the "Application Selection" menu item in response to rotational manipulation of the jog-dial 30 by the user, the CPU 50 will display a sub-menu 252 corresponding to the "Application Selection" menu item shown in FIG. 21.

Displayed in the sub-menu 252 in this case are, for example, a "Word Processor" sub-menu item to be selected when starting up a word processor application, an "E-mail" sub-menu item to be selected when starting up an e-mail program, a "Spreadsheet" sub-menu item to be selected when starting up a spreadsheet program, an "Internet" sub-menu item to be selected when starting up an Internet program, and a "Calculator" sub-menu item to be selected when starting up an electronic calculator program. However, there can also be cases where various menu items other than these are set as menu items of the sub-menu 252 corresponding to the "Application Selection" menu item.

In practice, if sub-menu item "3" is selected in response to rotational manipulation and pushing manipulation of the jog-dial 30 in the sub-menu 251 corresponding to the "Brightness" menu item shown in FIG. 20, the CPU 50 sets the liquid crystal display 21 to the brightness level corresponding to sub-menu item "3."

Also, if the "Word Processor" sub-menu item is selected in response to rotational manipulation and pushing manipulation of the jog-dial 30 in the sub-menu 252 corresponding to the "Application Selection" menu item shown in FIG. 21, the CPU 50 starts up a word processor application corresponding to the "Word Processor" sub-menu item. The procedure up to this point is a description of the launcher operation.

If, on the other hand, a positive result is obtained in step SP15 (FIG. 16), this indicates that started-up application software exists, and in this case the CPU 50 proceeds to the next step SP17.

In step SP17, the CPU 50 executes the prescribed event operation in accordance with the started-up application software, and then proceeds to the next step SP18 and terminates processing.

Here, the case will be described where the prescribed event operation is executed in accordance with various kinds of started-up application software. The started-up application software here has compatibility with the jog-dial 30 as a condition, and specifically, has an image display function.

Figure 22:
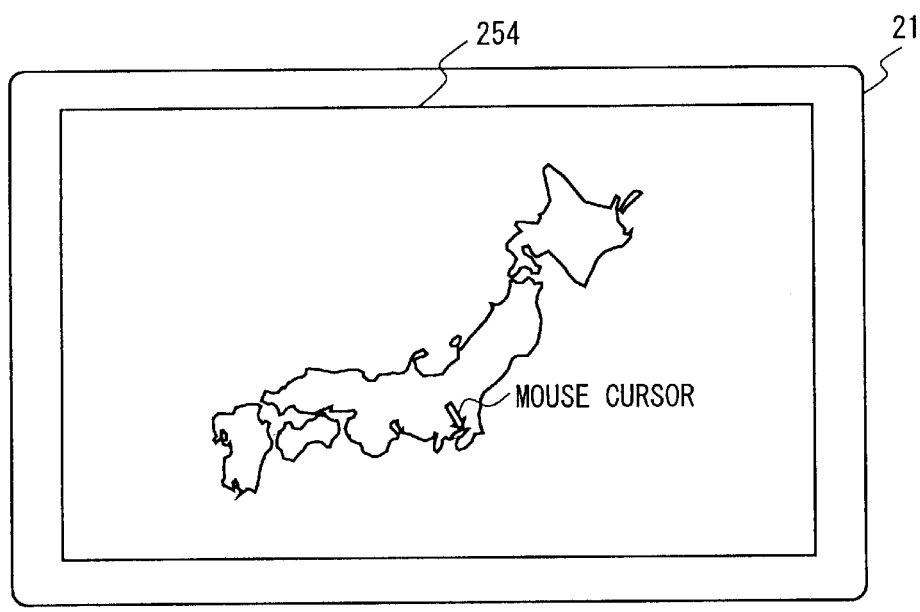
FIG. 22 is an abbreviated line drawing showing a map screen.
Figure 23:
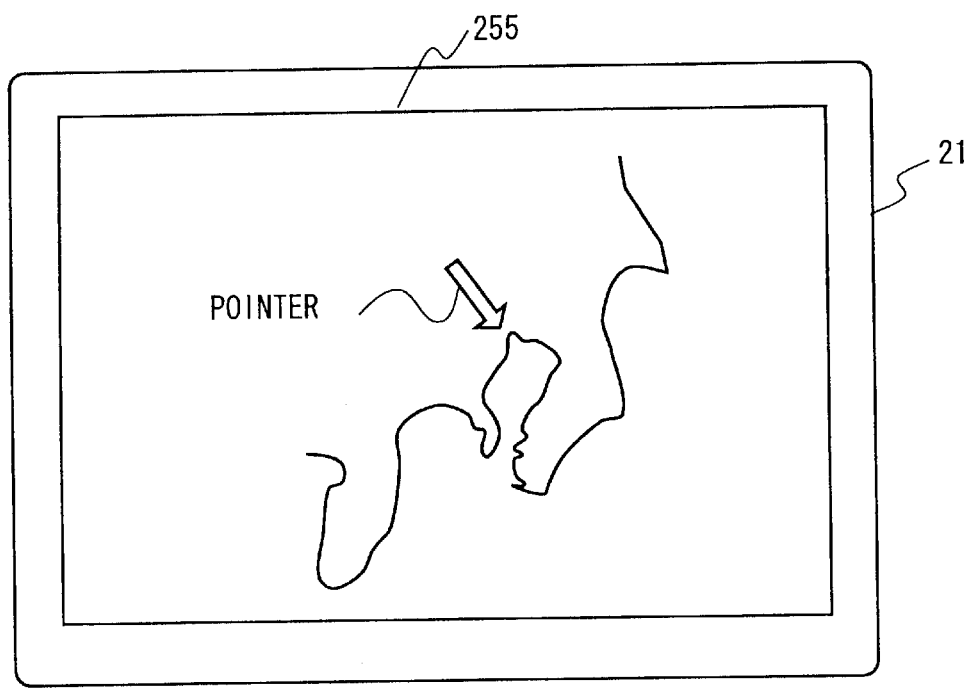
FIG. 23 is an abbreviated line drawing showing an enlarged display according to rotational manipulation of the jog-dial.

For example, if a map screen 254 of a map of Japan such as that shown in FIG. 22 is displayed on the liquid crystal display 21 by the prescribed map display application software, and rotational manipulation of the jog-dial 30 in the arrow a direction is performed while the mouse cursor is aligned with a desired position (Tokyo and vicinity) as a result of pointing manipulation of the stick 5 by the user, the CPU 50 will enlarge the map screen 254 in accordance with the rotational manipulation, and thereby generate and display on the liquid crystal display 21 an enlarged map screen 255 as shown in FIG. 23.

Also, if rotational manipulation of the jog-dial 30 in the arrow b direction is performed, the CPU 50 will reduce the map screen 254 in accordance with the rotational manipulation, and thereby generate and display on the liquid crystal display 21 a reduced map screen (not shown).

Thus, if rotational manipulation of the jog-dial 30 is performed when map display application software with a function for image display in accordance with the jog-dial 30 has been started up, the CPU 50 will enlarge or reduce the map screen 254 displayed on the liquid crystal display 21 in accordance with rotational manipulation of the jog-dial 30.

Next, the case will be described where the prescribed event operation is executed in accordance with moving image editing application software with a function for moving;image editing in accordance with the jog-dial 30.

Figure 24:
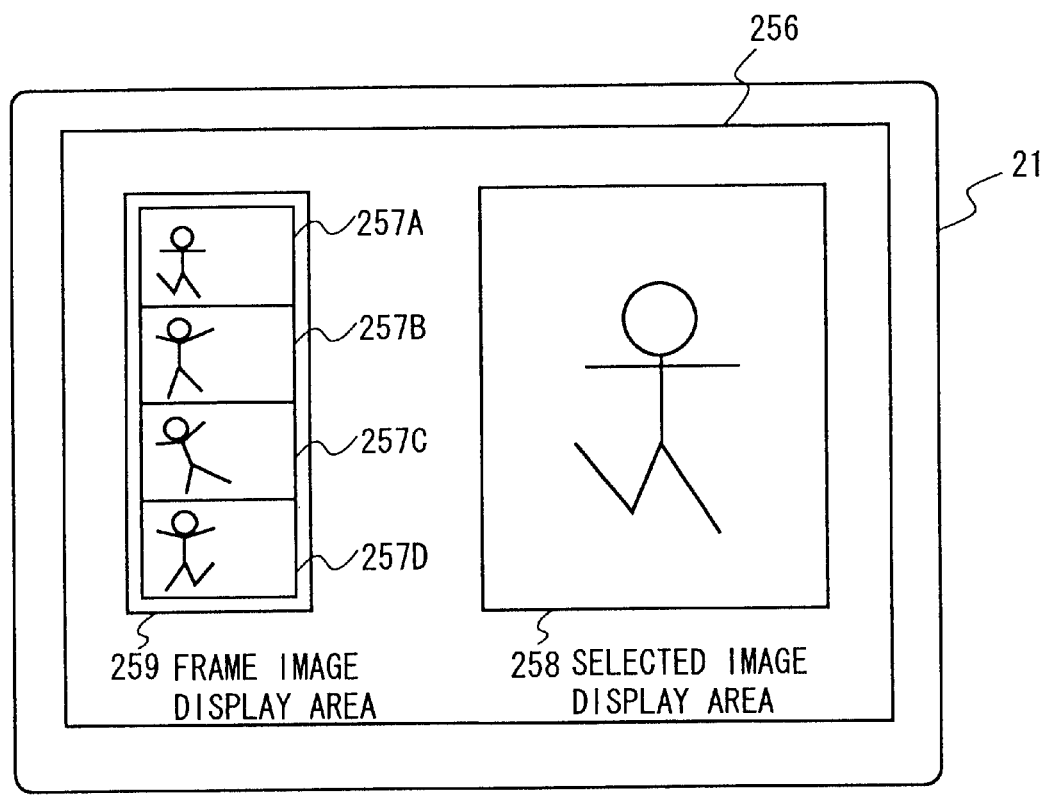
FIG. 24 is an abbreviated line drawing showing an editing screen.

In this case, an editing screen 256 such as that shown in FIG. 24 is displayed on the liquid crystal display 21 by means of moving image editing application software. This editing screen 256 is configured by a frame image display area 259 that displays four frame images S257A to S257D, which are consecutive in time, from among a plurality of still images or frame images as they are called comprising a moving image, and a selected image display area 258 that displays one of frame images S257A to S257D selected by frame advance or frame rewind in accordance with rotational manipulation of the jog-dial 30.

If rotational manipulation of the jog-dial 30 in the arrow a direction or arrow b direction is performed while such an editing screen 256 is displayed on the liquid crystal display 21, the CPU 50 displays on the selected image display area 258 the frame image S257A for example selected by means of rotational manipulation from among the frame images S257A to S257D in the frame image display area 259. By this means, the user can execute the desired image editing processing on the frame image S257A displayed in the selected image display area 258.

Figure 25:
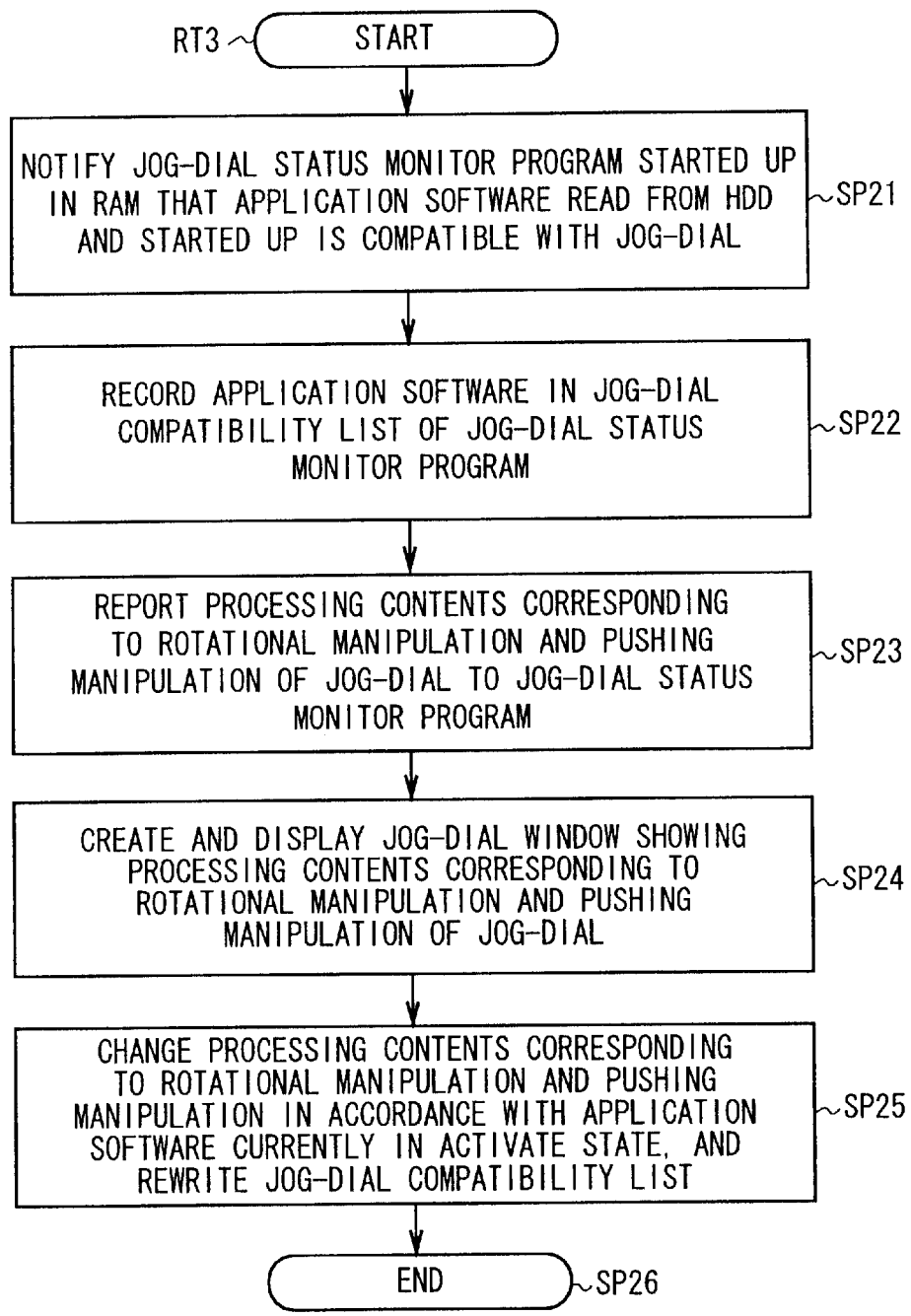
FIG. 25 is a flowchart showing the procedure for processing assignment according to manipulation of the jog-dial.

Incidentally, the CPU 50 needs to assign the prescribed processing according to rotational manipulation and pushing manipulation of the jog-dial 30 to the above described kind of application software compatible with the jog-dial 30. The procedure for assigning processing corresponding to manipulation of the jog-dial 30 will be described using the flowchart in FIG. 25.

In this case, the CPU 50 starts from the start step of routine RT3 and proceeds to step SP21. In step SP21, the CPU 50 notifies the jog-dial utility program started up in the RAM 53 that the application software read from the hard disk of the HDD 67 and started up in the RAM 53 is compatible with the jog-dial 30, and then proceeds to the next step SP22.

In step SP22, the CPU 50 records the started-up application software compatible with the jog-dial 30 in the jog-dial compatibility list of the jog-dial utility program in the RAM 53, and then proceeds to the next step SP23.

In step SP23, the CPU 50 writes to the jog-dial utility program in the RAM 53, the processing contents corresponding to rotational manipulation and pushing manipulation of the jog-dial 30 for the application software recorded in the jog-dial compatibility list, and then proceeds to the next step SP24.

Figure 26:
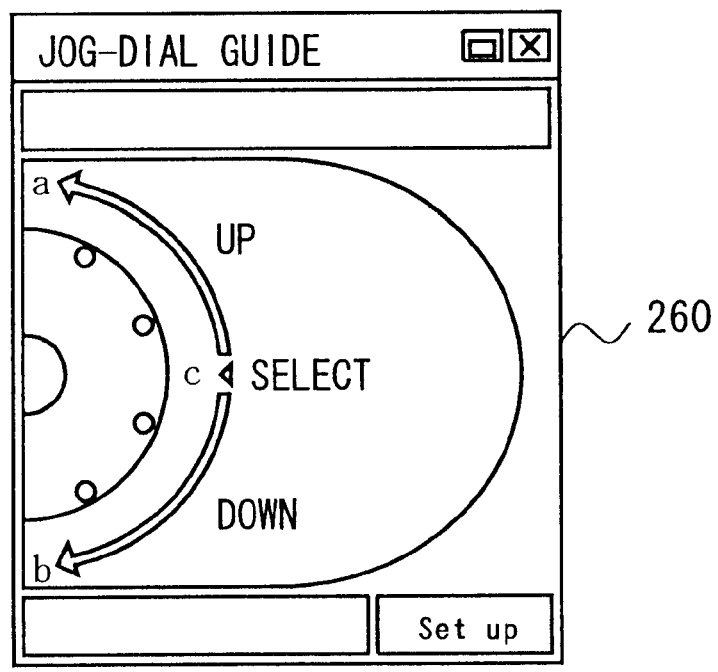
FIG. 26 is an abbreviated line drawing showing the jog-dial window.

In step SP24, the CPU 50 creates a jog-dial window 260 showing the processing contents corresponding to jog-dial 30 rotational manipulation and pushing manipulation as shown in FIG. 26, displays this on the liquid crystal display 21, and then proceeds to the next step SP25.

In this case, the purpose of the jog-dial window 260 is to give guidance as to what kind of processing is performed when the jog-dial 30 is manipulated. Items displayed in this window are "Up" indicating that the selector SL is moved upward through the menu items when the jog-dial 30 is rotated in the arrow a direction, "Down" indicating that the selector SL is moved downward through the menu items when the jog-dial 30 is rotated in the arrow b direction, and "Select" indicating that the selector SL selects a menu item when the jog-dial 30 is pushed in the arrow c direction.

In step SP25, if the active application software is changed by the user, the CPU 50 changes the processing contents corresponding to rotational manipulation and pushing manipulation in accordance with the window screen of that changed application software, and also creates and displays a new jog-dial window 260 after rewriting the jog-dial compatibility list, and then proceeds to the next step SP26 and terminates processing.

(2) Menu Selection Using Jog-Dial

Next, the case will be described where everything from selection of the desired application to switching of various modes and function set in that application is performed with the jog-dial 30 on the notebook personal computer with jog-dial 1.

Figure 27:
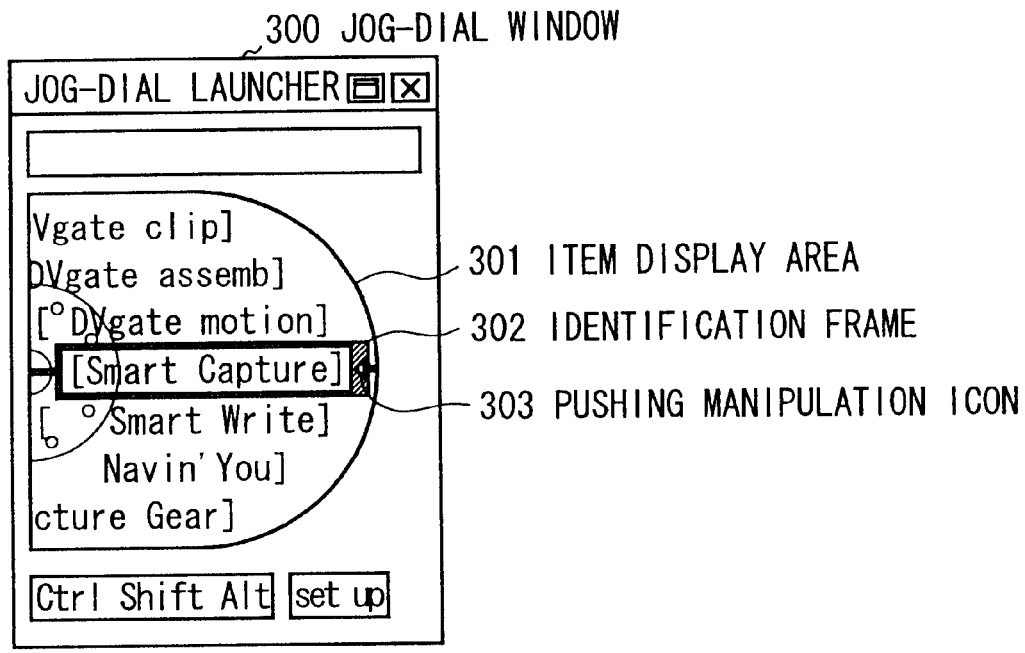
FIG. 27 is an abbreviated line drawing showing the launcher status jog-dial window.

If there is no activated application in normal mode, the CPU 50 of the notebook personal computer with jog-dial 1 displays on the liquid crystal display 21 a launcher status jog-dial window 300 as shown in FIG. 27 in accordance with the jog-dial utility program.

In this launcher status jog-dial window 300, a plurality of menu items of activatable jog-dial compatible applications (for example, [DVgate clip], [DVgate assemb], [DVgate motion], [Smart Capture], [Smart Write], [Navin' You], and [Picture Gear]) are displayed in a ring arrangement in an item display area 301.

Also, the launcher status jog-dial window 300 is provided with an identification frame 302 for identifying the menu item moved to the center of the item display area 301 by rotational manipulation of the jog-dial 30 by the user.

When a menu item is positioned in this identification frame 302 of the item display area 301, the CPU 50 displays a pushing manipulation icon 303, which is a left-facing triangle, that prompts the user to push the jog-dial 30, and in response to pushing manipulation of the jog-dial 30 by the user, starts up the application corresponding to the menu item in the identification frame 302.

Figure 28:
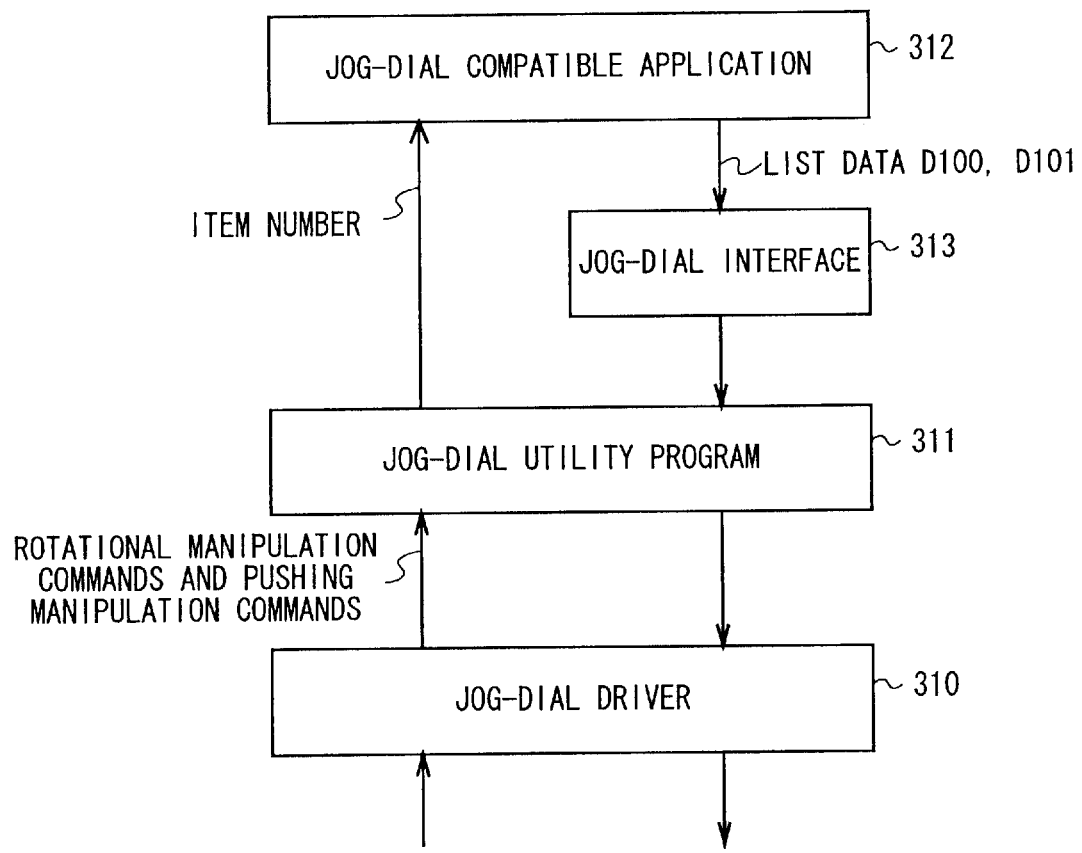
FIG. 28 is an abbreviated line drawing accompanying the description of list data transfer.

Incidentally, the CPU 50 of the notebook personal computer with jog-dial 1 accepts, by means of the jog-dial utility program 311 and via the jog-dial driver 310, jog-dial 30 rotational manipulation commands and pushing manipulation commands supplied from the I/O controller 73 (not shown), as shown in FIG. 28.

Thus the CPU 50 can constantly monitor the menu item positioned in the identification frame 302 of the item display area 301 by rotational manipulation of the jog-dial 30 in the launcher status jog-dial window 300, and when the jog-dial 30 is pushed, starts up, for example, the jog-dial compatible application 312 for menu item [Smart Capture] positioned in the identification frame 302, and displays it on the liquid crystal display 21.

Figure 29:
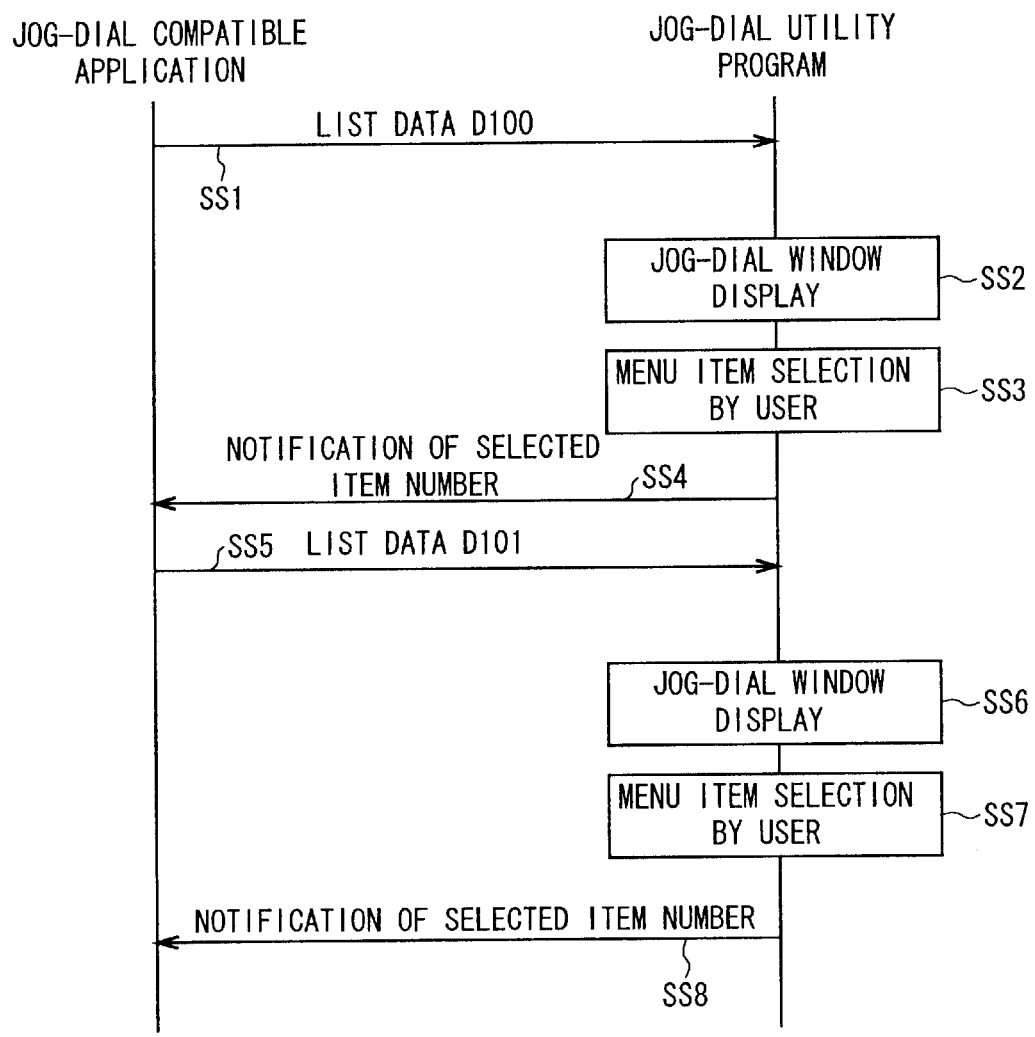
FIG. 29 is a flowchart showing the procedure for menu item hierarchy display in the jog-dial window.

At the same time, the CPU 50 accepts from the [Smart Capture] jog-dial compatible application 312 as the first step SS1 shown in FIG. 29, by means of the jog-dial utility program 311 and via the jog-dial interface 313, list data D100 for displaying as menu items various modes and functions relating to that jog-dial compatible application 312, and outputs this from the jog-dial driver 310 to the liquid crystal display 21 via the video controller 56 (FIG. 12).

Figure 30:
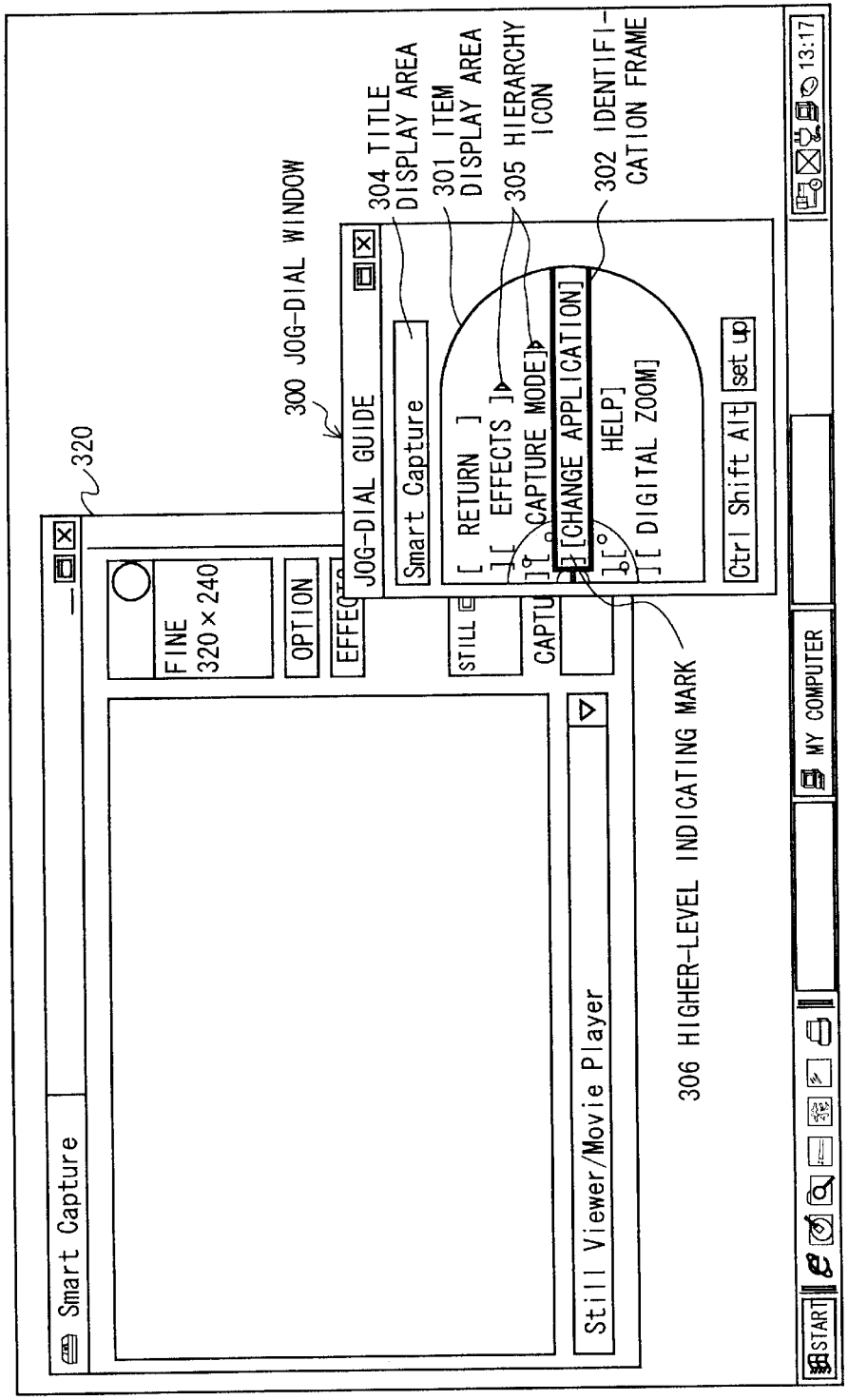
FIG. 30 is an abbreviated line drawing showing the guidance status jog-dial window.

By this means, the liquid crystal display 21 displays a [Smart Capture] application window 320 as shown in FIG. 30, and also displays new menu items for selecting various modes and functions in the item display area 301 on the basis of the list data D100 as the second step SS2 (FIG. 29), thereby providing a guidance status jog-dial window 300.

This guidance status jog-dial window 300 provides for all the modes and functions that can be processed by the [Smart Capture] application window 320, and the title [Smart Capture] is displayed by the CPU 50 in a title display area 304.

Figure 31A:
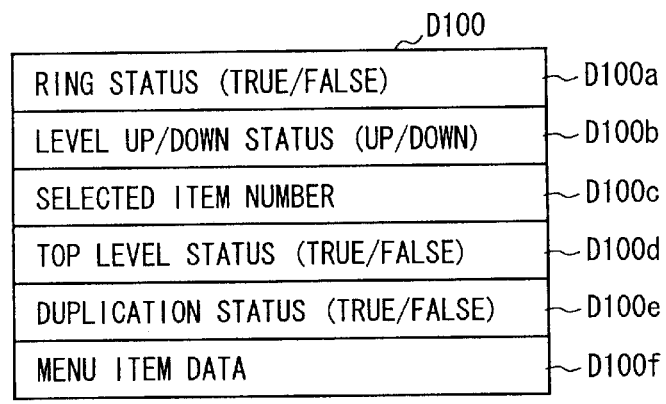
FIGS. 31A and 31B are abbreviated line drawings showing the data structure of list data.

Here, the list data D100 for displaying menu items in the item display area 301 of the jog-dial window 300 is configured by a ring status flag D100$a$, level up/down status flag D100$b$, selected item number D100$c$, top level status flag D100$d$, duplication status flag D100$e$, and menu item data D100$f$, as shown in FIG. 31A.

In this list data D100, the ring status flag D100$a$ is a flag that indicates as TRUE/FALSE whether or not a plurality of menu items displayed in the item display area 301 of the jog-dial window 300 are items rotationally displayed in ring form in accordance with rotational manipulation of the jog-dial 30.

The level up/down status flag D100$b$ is a flag that indicates as UP/DOWN whether or not a plurality of menu items displayed this time in the item display area 301 are located at a higher level with respect to the plurality of menu items displayed one step before, or are located at a lower level.

For example, when a plurality of menu items displayed this time in the item display area 301 are located at a lower level with respect to the menu items displayed one step before, the DOWN flag is raised, and when a plurality of menu items displayed this time are located at a higher level with respect to the menu items displayed one step before, the UP flag is raised.

The selected item number D100$c$ is data that indicates the item number (item 1 to N) corresponding to the menu item selected by rotational manipulation and pushing manipulation of the jog-dial 30, and the top level status flag D100$d$ is a flag that indicates as TRUE/FALSE whether or not this list data D100 is located at the top level.

The duplication status flag D100$e$ is a flag that indicates as TRUE/FALSE whether or not the jog-dial compatible application 312 has two kinds of menu item data D100$f$ simultaneously; if it has two kinds, two kinds of menu item data D100$f$ also exist.

Figure 31B:
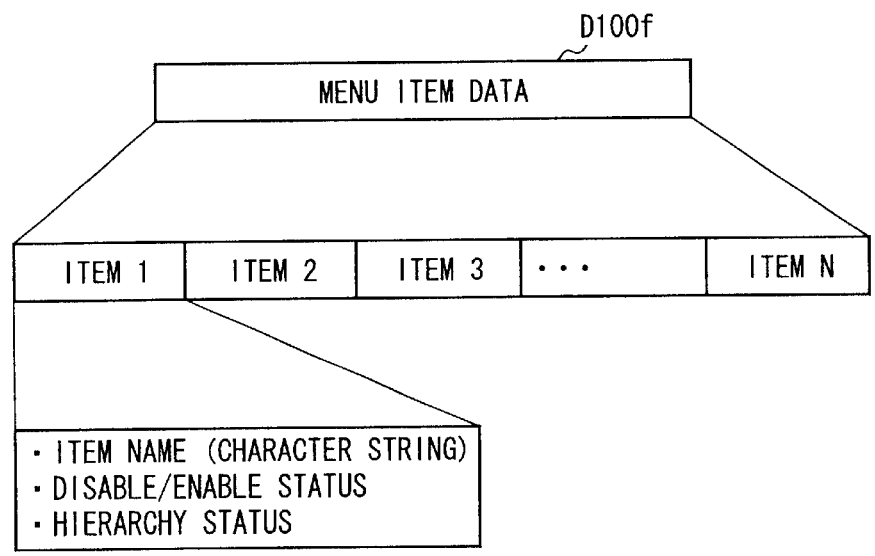

Also, the menu item data D100$f$ includes, for example, data for items 1 to N as individual menu items corresponding respectively to various modes and functions displayed in the item display area 301, as shown in FIG. 31B.

In each of items 1 to N there is stored the item name (character string) of the menu item displayed in the item display area 301, a disable/enable status flag indicating whether the displayed menu item is enabled or disabled, and a hierarchy status flag indicating whether or not, when there is a lower-level sub-menu for that item, a hierarchy icon (described later) is displayed to notify the user to that effect.

In practice, various modes and functions are displayed as menu items in the item display area 301 of the guidance status jog-dial window 300 (FIG. 30) corresponding to the [Smart Capture] jog-dial compatible application 312, with, for example, the names [Return], [Effects], [Capture Mode], [Change Application], [Help], and [Digital Zoom].

In the item display area 301 of this jog-dial window 300, if the ring status flag D100$a$ of the list data D100 is TRUE, a plurality of menu items are displayed in ring form by the CPU 50, and all the menu items are displayed in ring form in order simply by rotating the jog-dial 30 in one direction only.

Also, in the item display area 301 of the guidance status jog-dial window 300, a higher-level indicating mark 306 "]" is displayed to the left of each of the [Smart Capture] menu items [Effects], [Capture Mode], [Change Application], [Help], and [Digital Zoom], giving visual indication of the existence of a launcher status jog-dial window 300 menu item located at a higher level than the [Smart Capture] menu items.

Thus, when menu item [Return] of the item display area 301 is positioned in the identification frame 302 and the jog-dial 30 is pushed, the CPU 50 returns to and displays the launcher status jog-dial window 300 (FIG. 27).

Also, the CPU 50 displays a hierarchy icon 305, comprising a right-facing triangle, to the right of menu items [Effects] and [Capture Mode] on the basis of the hierarchy status flag added to individual items 1 to N, and by means of this hierarchy icon 305 the user is given visual indication of the existence of a lower-level sub-menu.

At this time, if a lower-level sub-menu also exists for menu item [Change Application], the CPU 50 displays the identification frame 302 with its right side not closed but left open.

By displaying the identification frame 302 with its right side not closed but left open in this way, the CPU 50 can indicate to the user graphically that a lower-level sub-menu also exists for menu item [Change Application] positioned in the identification frame 302, in the same way as for menu items [Effects] and [Capture Mode] with the hierarchy icon 305 attached outside the identification frame 302.

When, as the third step SS3 (FIG. 29), the CPU 50 recognizes that the jog-dial 30 has been pushed while menu item [Capture Mode], for example, is positioned in the identification frame 302 of the item display area 301 as the result of rotational manipulation of the jog-dial 30 by the user, as the fourth step SS4 (FIG. 29) the CPU 50 reports the item number (1 to N) corresponding to a rotational manipulation command or pushing manipulation command to the jog-dial compatible application 312.

Then, as the fifth step SS5 (FIG. 29), the CPU 50 receives, by means of the jog-dial utility program 311 and via the jog-dial interface 313, list data D101 corresponding to menu item [Capture Mode] (in this case, list data corresponding to item 2 of the menu item data D100$f$) from the [Smart Capture] jog-dial compatible application 312.

Next, as the sixth step SS6 (FIG. 29), the CPU 50 displays a plurality of menu items corresponding to [Capture Mode] in the item display area 301 of the guidance status jog-dial window 300, on the basis of the list data D101.

Figure 32A:
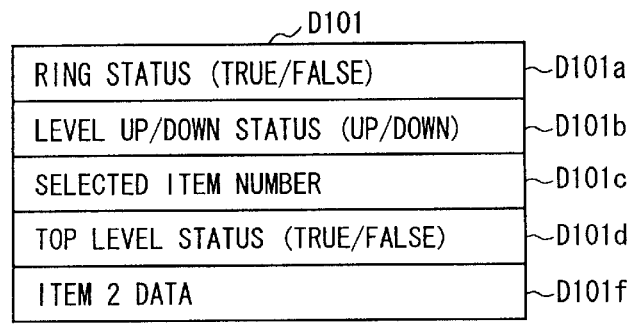
FIGS. 32A and 32B are abbreviated line drawings showing the data structure of list data for selected item 2.
Figure 32B:
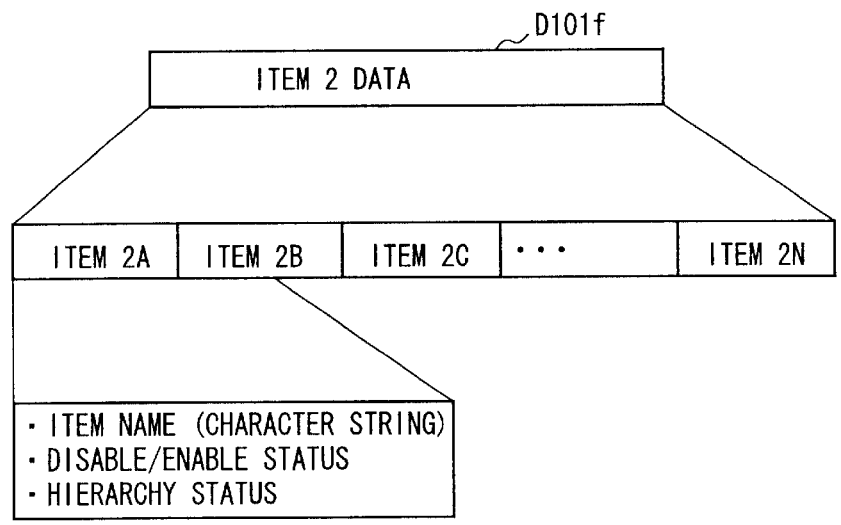

Here, as shown in FIGS. 32A and 32B, the list data D101 corresponding to menu item [Capture Mode] is virtually the same as list data D100 (FIGS. 31A and 31B), but since it is located at a lower level than list data D100, the top level status flag D101$d$ is "FALSE," and there is nothing equivalent to the duplication status flag D100$e$ of list data D100.

Figure 33:
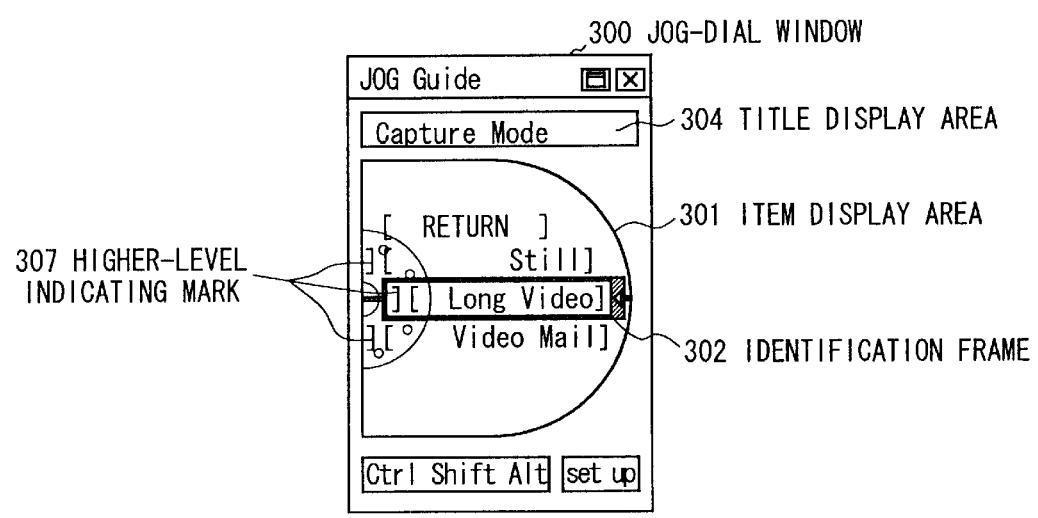
FIG. 33 is an abbreviated line drawing showing the jog-dial window corresponding to menu item [Capture Mode]

By this means, the CPU 50 rewrites the title of the title display area 304 from [Smart Capture] to [Capture Mode], and displays this, in the guidance status jog-dial window 300, on the basis of the list data D101, as shown in FIG. 33, and also displays in the item display area 301 a plurality of menu items ([Return], [Still], [Long Video], and [Video Mail]) corresponding to menu item [Capture Mode].

Also, at this time, on the basis of the DOWN flag in the level up/down status flag D101b of the list data D101, the CPU 50 left-scrolls all the [Smart Capture] menu items displayed thus far in the item display area 301, and displays the menu items ([Return], [Still], [Long Video], and [Video Mail]) corresponding to [Capture Mode].

By this means, the CPU 50 can give the user visual indication by means of scroll display of the situation regarding the change from the menu items in the [Smart Capture] of the guidance status jog-dial window 300 to the menu items corresponding to [Capture Mode], which is one of those modes.

In this guidance status jog-dial window 300, also, a higher-level indicating mark 307 "[" is displayed to the left of each of the menu items ([Return], [Still], [Long Video], and [Video Mail]) of the item display area 301, giving the user visual indication of the existence of [Smart Capture] menu items located at a higher level that the [Capture Mode] menu items.

When, as the seventh step SS7 (FIG. 29), the CPU 50 recognizes that the [Long Video] menu item, for example, has been positioned in the identification frame 302 in the item display area 301 of the jog-dial window 300 by rotational manipulation of the jog-dial 30 and selected by pushing manipulation of the jog-dial 30, as the eighth step SS8 (FIG. 29) the CPU 50 reports the item number of menu item [Long Video] to the jog-dial compatible application 312, enables execution of the function corresponding to menu item [Long Video], and displays the menu item [Long Video] characters in orange.

By this means, the CPU 50 can enable the user to recognize easily, by an orange character display, that menu item [Long Video] is currently selected from within [Capture Mode] in the [Smart Capture] jog-dial compatible application 312.

Incidentally, until a menu item other than menu item [Long Video] is selected in the item display area 301, the CPU 50 continues to display the menu item [Long Video] characters in orange even if the menu items are moved by rotational manipulation of the jog-dial 30. When menu item [Return] is selected, the CPU 50 returns the jog-dial window 320 to the menu item display corresponding to [Smart Capture] (FIG. 30).

If the number of menu item characters positioned in the identification frame 302 in the item display area 301 is, for example, 13 or more, the CPU 50 repeatedly displays the characters in the identification frame 302 while scrolling them from right to left, on the basis of the jog-dial utility program 311, thereby enabling full understanding by the user even within the item display area 301 in which a limited number of characters can be displayed at one time.

If the Shift key (not shown) among the operating keys 4 (FIG. 1) is pressed by the user in the guidance status jog-dial window 300 (FIG. 30) displaying the menu items ([Return], [Effects], [Capture Mode], [Change Application], [Help], and [Digital Zoom]) in [Smart Capture], the CPU 50 judges whether two kinds of menu item data D100f exist on the basis of the duplication status flag D100e of the list data D100 (FIGS. 31A and 31B).

Figure 34:
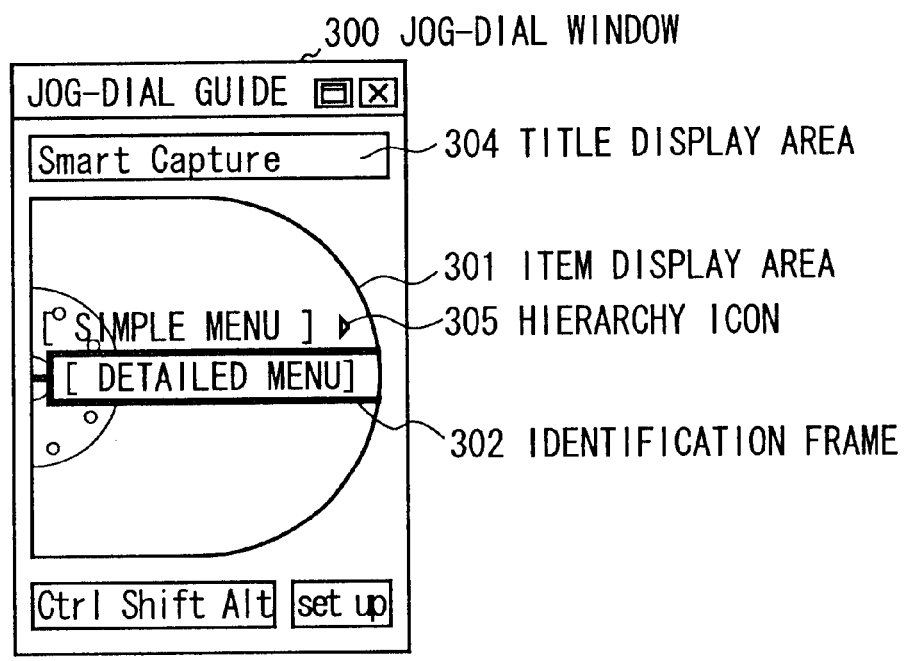
FIG. 34 is an abbreviated line drawing showing the jog-dial window corresponding to a duplication list.

Then, if two kinds of menu item data D100f exist, the CPU 50 displays the titles ([Detailed Menu], [Simple Menu]) of the two kinds of menu item data D100f in the item display area 301, as shown in FIG. 34.

In this case, menu item [Detailed Menu] is positioned in the identification frame 302 and displayed in orange, and the fact that the menu items ([Return], [Effects], [Capture Mode], [Change Application], [Help], and [Digital Zoom]) corresponding to [Detailed Menu] were displayed until shortly before in [Smart Capture] is indicated.

Incidentally, the hierarchy icon 305 is also displayed to the right of menu item [Simple Menu] displayed in the item display area 301, and the identification frame 302 in which menu item [Detailed Menu] is positioned is displayed with its right side left open.

Next, when the user positions menu item [Simple Menu] in the identification frame 302 by rotating the jog-dial 30, and pushes the jog-dial 30, the CPU 50 displays the same plurality of menu items ([Return], [Still], [Long Video], and [Video Mail]) as in FIG. 33 in the item display area 301.

That is to say, when menu item [Simple Menu] is selected, the CPU 50 directly displays the menu items ([Return], [Still], [Long Video], and [Video Mail]) corresponding to [Capture Mode], enabling rapid display of frequently used [Capture Mode] menu items by the selection of menu item [Simple Menu] by the user.

Figure 35:
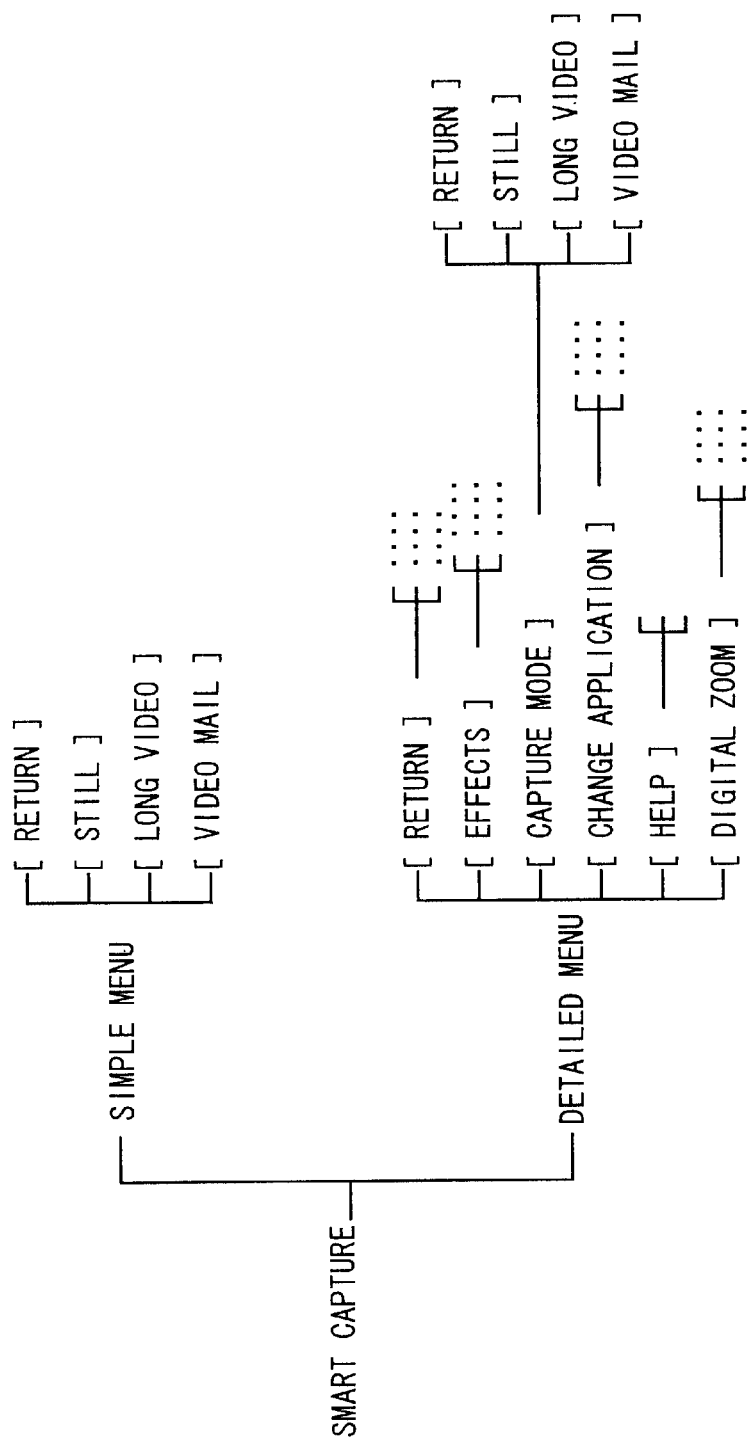
FIG. 35 is an abbreviated line drawing showing the hierarchical structure of menus in Smart Capture.

Thus the [Smart Capture] jog-dial compatible application 312 is a menu configured by two kinds of hierarchical structure ([Detailed Menu] and [Simple Menu]), as shown in FIG. 35, and the CPU 50 switches the display of the two kinds of menu items in the item display area 301 of the guidance status jog-dial window 300 according to whether the Shift key is pressed or not pressed, and can perform hierarchical display of the [Detailed Menu] and [Simple Menu] sub-menus in response to rotational manipulation and pushing manipulation of the jog-dial 30.

(2-1) Menu Hierarchical Display Processing Procedure

Figure 36:
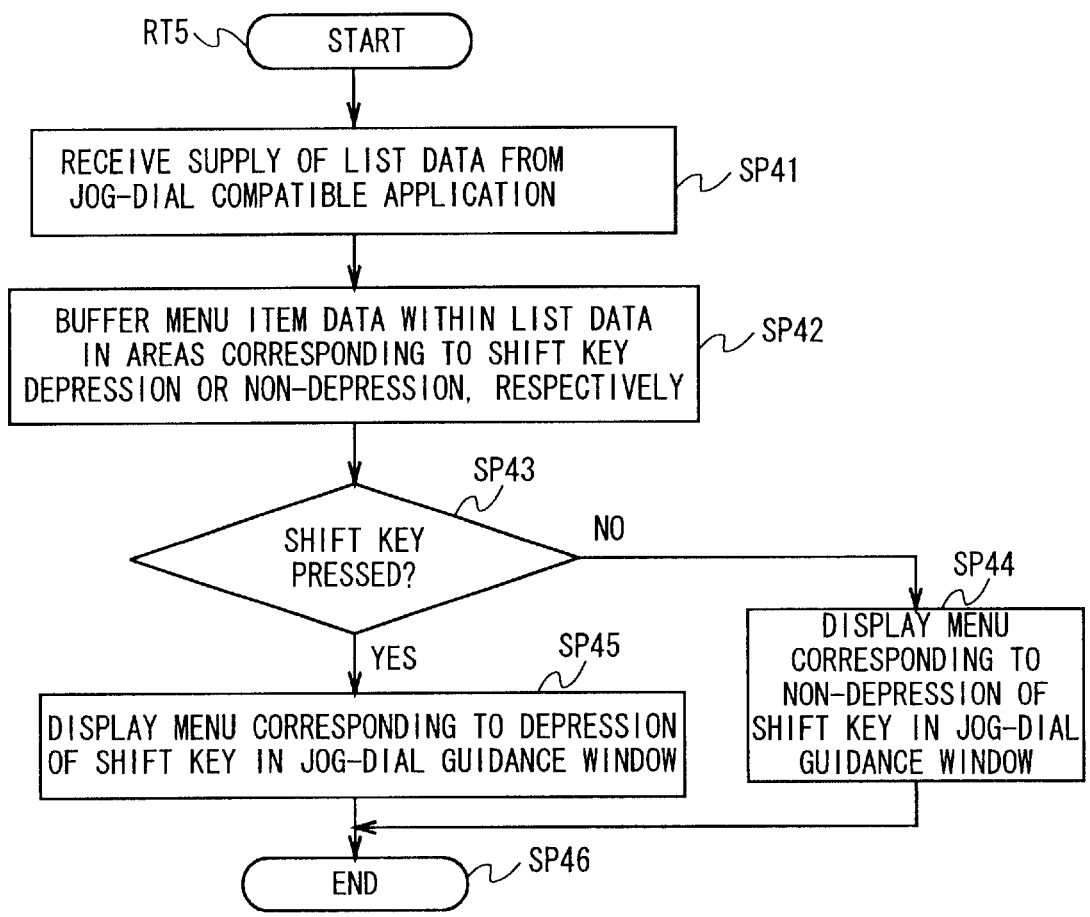
FIG. 36 is a flowchart showing the menu display processing procedure according to depression or non-depression of the Shift key.

Next, the menu display processing procedure according to whether the Shift key is pressed or not pressed when two kinds of the above described menu item data D100f exist will be described using the flowchart in FIG. 36. The CPU 50 of the notebook personal computer with jog-dial 1 first starts from the start step of routine RT5 and proceeds to step SP41.

In step SP41, the CPU 50 receives the supply of the list data D100 from the [Smart Capture] jog-dial compatible application 312, and then proceeds to the next step SP42.

In step SP42, if the CPU 50 detects that two kinds of menu item data D100f exist on the basis of the duplication status flag D100e of the received list data D100, it divides and buffers the two kinds of menu item data D100f in separate areas in the RAM 53 corresponding to Shift key depression or non-depression, respectively, and then proceeds to the next step SP43.

In step SP43, the CPU 50 judges whether the Shift key has been pressed. If a negative result is obtained here, this indicates that the Shift key has not been pressed by the user, and in this case the CPU 50 proceeds to the next step SP44.

In step SP44, the CPU 50 displays the [Smart Capture] menu items (FIG. 30) corresponding to non-depression of the Shift key in the item display area 301 of the guidance status jog-dial window 300, and then proceeds to the next step SP46 and terminates processing.

If, on the other hand, a positive result is obtained in step SP43, this indicates that the Shift key has been pressed by the user, and in this case the CPU 50 proceeds to the next step SP45.

In step SP45, since the Shift key has been pressed, the CPU 50 displays the menu items ([Detailed Menu] and [Simple Menu]) corresponding to depression of the Shift key in the item display area 301 of the guidance status jog-dial window 300, and if menu item [Simple Menu] is selected by the user, displays the [Capture Mode] menu items ([Return], [Still], [Long Video], and [Video Mail]) corresponding to that [Simple Menu], and then proceeds to the next step SP46 and terminates processing.

Figure 37:
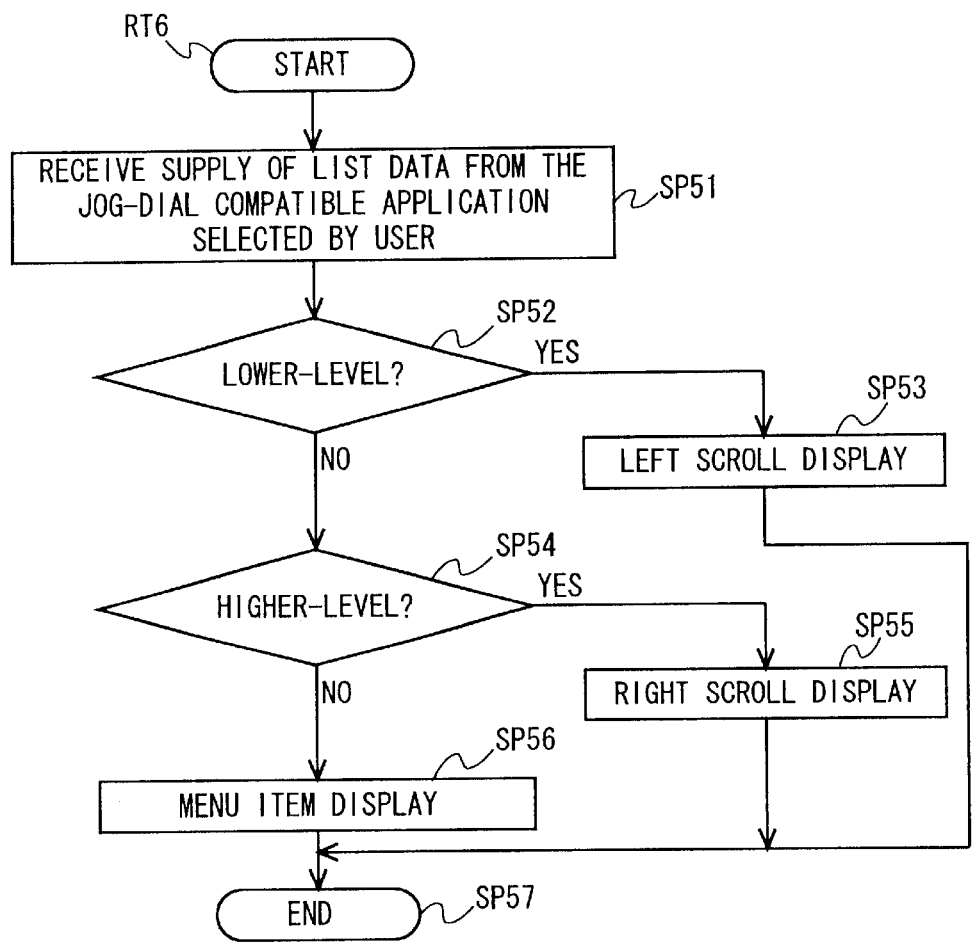
FIG. 37 is a flowchart showing the menu item scroll display processing procedure.

(2-2) Scroll Display Processing Procedure of all Menu Items in Accordance with Level Up/Down Status Flag Next, the scroll display processing procedure for performing scroll display of all menu items in accordance with the level up/down status flag of the supplied list data will be described using the flowchart in FIG. 37.

The CPU 50 of the notebook personal computer with jog-dial 1 first starts from the start step of routine RT6 and proceeds to step SP51.

In step SP51, the CPU 50 receives the supply of list data from the jog-dial compatible application 312, and then proceeds to the next step SP52.

In step SP52, the CPU 50 judges whether the level up/down status flag of the list data is LOWER-LEVEL. If a positive result is obtained here, this indicates that the level up/down status flag is LOWER-LEVEL, and in this case the CPU 50 proceeds to the next step SP53.

In step SP53, the CPU 50 displays menu items based on the list data supplied this time, while left-scrolling all the menu items of one step before displayed in the item display area 301 in the jog-dial window 300, and then proceeds to the next step SP57 and terminates processing.

If, on the other hand, a negative result is obtain in step SP52, this indicates that the level up/down status flag is not LOWER-LEVEL, and in this-case the CPU 50 proceeds to the next step SP54.

In step SP54, the CPU 50 judges whether the level up/down status flag D100b of the list data is HIGHER-LEVEL. If a positive result is obtained here, this indicates that the level up/down status flag D100b is HIGHER-LEVEL, and in this case the CPU 50 proceeds to the next step SP55.

In step SP55, the CPU 50 displays menu items based on the list data supplied this time, while right-scrolling all the menu items of one step before displayed in the item display area 301 in the jog-dial window 300, and then proceeds to the next step SP57 and terminates processing.

If, on the other hand, a negative result is obtain in step SP54, this indicates that the level up/down status flag is neither HIGHER-LEVEL nor LOWER-LEVEL, and in this case the CPU 50 proceeds to the next step SP56.

In step SP56, using the normal method the CPU 50 displays menu items based on the list data supplied this time in the item display area 301 in the jog-dial window 300, and then proceeds to the next step SP57 and terminates processing.

In practice, when the CPU 50 of the notebook personal computer with jog-dial 1 receives the supply of list data D100 from the jog-dial compatible application 312 selected by the user in the launcher status jog-dial window 300 (FIG. 27) in step SP51, it proceeds to the next step SP52.

In step SP52 and step SP54, since the list data D100 supplied from the jog-dial compatible application 312 is located at the top level, the level up/down status flag D100b is neither LOWER-LEVEL nor HIGHER-LEVEL, and in the next step SP56 the CPU 50, using the normal method, switches display of item display area 301 menu items from the launcher status jog-dial window 300 (FIG. 27) to the guidance status jog-dial window 300.

Also, in step SP51, when the CPU 50 of the notebook personal computer with jog-dial 1 receives the supply of list data D101 from the jog-dial compatible application 312 when menu item [Capture Mode] has been selected by the user in the guidance status jog-dial window 300 (FIG. 30) corresponding to the [Smart Capture] jog-dial compatible application 312, the CPU 50 proceeds to the next step SP52.

In step 52, since the list data D101 supplied from the [Smart Capture] jog-dial compatible application 312 at this time is located at a lower level of list data D100, the level up/down status flag D101b is LOWER-LEVEL, and the CPU 50 proceeds to the next step SP53.

In step SP53, the CPU 50 displays menu items corresponding to menu item [Capture Mode] on the basis of the list data D101, while performing left-scroll display of all the item display area 301 menu items in the guidance status jog-dial window 300 (FIG. 30) corresponding to [Smart Capture].

Also, in step SP51, when the CPU 50 of the notebook personal computer with jog-dial 1 receives the supply of the list data D100 from the jog-dial compatible application 312 when menu item [Return] has been selected by the user in the [Capture Mode] item display area 301, the CPU 50 proceeds to the next step SP52.

In step SP52 and step SP54, due to the fact that the CPU 50 receives the supply of list data D100 located at a higher-level of list data D101 from the jog-dial compatible application 312 on the basis of menu item [Return] selected in the [Capture Mode] item display area 301 at this time, the level up/down status flag D100b is HIGHER-LEVEL, and the CPU 50 proceeds to the next step SP55.

In step SP55, the CPU 50 displays in the item display area 301 menu items corresponding to menu item [Smart Capture] on the basis of the list data D100, while performing right-scroll display of the menu items of the item display area 301 (FIG. 33) corresponding to [Capture Mode].

In this way, the CPU 50 enables the user to recognize changes in hierarchy easily by performing scroll-display of all menu items from higher-level to lower-level, or from lower-level to higher-level, according to the level up/down status flag D100b of the list data D100 and the level up/down status flag D101b of the list data D101 supplied from the jog-dial compatible application 312.

(2-3) Menu Item Display Processing Procedure

Figure 38:
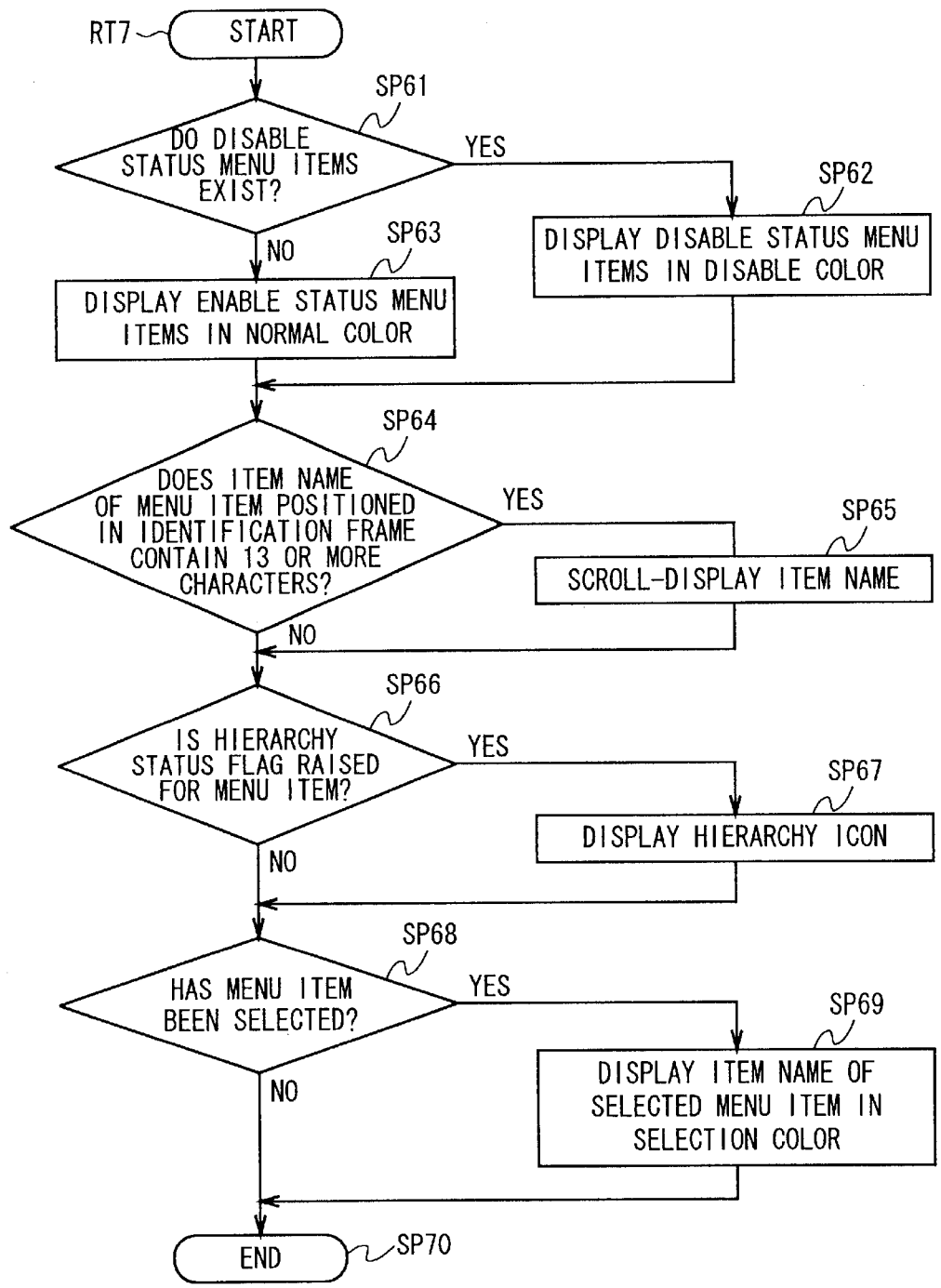
FIG. 38 is a flowchart showing the menu display processing procedure.

Lastly, the display processing procedure for displaying menu items in the item display area 301 of the jog-dial window 300 will be described using the flowchart in FIG. 38.

The CPU 50 of the notebook personal computer with jog-dial 1 first starts from the start step of routine RT7 and proceeds to step SP61.

In step SP61, the CPU 50 judges whether a disable status menu item (item 1 to N) exists in the menu item data D100f of the list data D100 supplied from the jog-dial compatible application 312.

If a positive result is obtained here, this indicates that the disable/enable status flag of an item from 1 to N in the menu item data D100f is DISABLE STATUS, and in this case the CPU 50 proceeds to the next step SP62.

In step SP62, the CPU 50 displays disable status menu items in a disable color in the item display area 301 of the guidance status jog-dial window 300 corresponding to [Smart Capture], for example, and then proceeds to the next step SP63.

If, on the other hand, a negative result is obtained in step SP61, this indicates that the disable/enable status flag of an item from 1 to N is ENABLE STATUS, and in this case the CPU 50 proceeds to the next step SP63.

In step SP63, the CPU 50 displays enable status menu items in the normal color in the item display area 301 of the jog guidance status dial window 300 corresponding to [Smart Capture], and then proceeds to the next step SP64.

In step SP64, the CPU 50 judges whether the item name of the menu item positioned in the identification frame 302 of the item display area 301 contains 13 or more characters. If a positive result is obtained here, this indicates that the item name of the menu item contains 13 or more characters, and in this case the CPU 50 proceeds to the next step SP65.

In step SP65, the CPU 50 repeatedly displays the characters of the menu item positioned in the identification frame 302 while scrolling them from right to left on the basis of the jog-dial utility program 311, and then proceeds to the next step SP66.

If, on the other hand, a negative result is obtained in step SP64, this indicates that the item name of the menu item positioned in the identification frame 302 contains fewer than 13 characters, and in this case the CPU 50 performs normal display and proceeds to the next step SP66.

In step SP66, the CPU 50 judges whether the hierarchy status flag in the menu item data D100f of the list data D100 is raised. If a positive result is obtained here, this indicates that the hierarchy status flag is raised, and in this case the CPU 50 proceeds to the next step SP67.

In step SP67, the CPU 50 displays the hierarchy icon 305 to the right of individual menu items in the item display area 301 of the jog-dial window 300 according to the hierarchy status flag, and then proceeds to the next step SP68.

If, on the other hand, a negative result is obtained in step SP66, this indicates that the hierarchy status flag is not raised, and in this case the CPU 50 proceeds to the next step SP68.

In step SP68, the CPU 50 judges whether the menu item positioned in the identification frame 302 of the item display area 301 has been selected by pushing manipulation of the jog-dial 30 by the user. If a positive result is obtained here, this indicates that the menu item has been selected by pushing manipulation of the jog-dial 30 by the user, and in this case the CPU 50 proceeds to the next step SP69.

In step SP69, the CPU 50 indicates to the user the currently selected menu item by displaying the item name (character string) of the selected menu item in orange, which is the selection color, and then proceeds to the next step SP70 and terminates processing.

If, on the other hand, a negative result is obtained in step SP68, this indicates that menu item selection has not been executed by the user, and in this case the CPU 50 proceeds to the next step SP70 and terminates display processing.

(3) Operation and Effect of the Embodiment

In the above configuration, when the user's desired menu item [Smart Capture] is positioned in the central identification frame 302 and selected by means of rotational manipulation and pushing manipulation of the jog-dial 30 in the launcher status jog-dial window 300 displayed (FIG. 27) when there is no activated application, the notebook personal computer with jog-dial 1 displays the [Smart Capture] application window 320, and also switches display of item display area 301 menu items from the launcher status jog-dial window 300 to the guidance status jog-dial window 300 (FIG. 30).

At this time, the CPU 50 of the notebook personal computer with jog-dial 1 can enable the user to recognize easily that a lower-level sub-menu exists for menu items [Effects] and [Capture Mode] by displaying the hierarchy icon 305 to the right of menu items [Effects] and [Capture Mode] of the item display area 301 according to the hierarchy status flag of individual items 1 to N.

Also, the CPU 50 can enable the user to recognize easily, in the same way as with the hierarchy icon 305, that a lower-level sub-menu exists for menu item [Change Application] in the identification frame 302 by displaying the identification frame 302 located in the center of the item display area 301 with its right side not closed but left open.

Further, when menu item [Capture Mode] is positioned in the identification frame 302 and selected by means of rotational manipulation and pushing manipulation of the jog-dial 30, the CPU 50 can give the user visual indication of the situation regarding the change from a higher-level menu to a lower-level menu by performing scroll display of menu items of the item display area 301 in the guidance status jog-dial window 300 (FIG. 33) corresponding menu item [Capture Mode].

In this case, the guidance status jog-dial window 300 corresponding to menu item [Capture Mode] (FIG. 33) indicates that the menu item located at the lowest level is being displayed in the item display area 301 by display of the higher-level indicating mark 307, and display of the hierarchy icon 305 or display of the identification frame 302 with its right side left open is not performed.

Here, if a menu item character string is positioned in the identification frame 302 of the item display area 301 as 13 or more characters, the CPU 50 can enable the user to easily recognize the menu item character string even within the identification frame 302, which is a display area in which a limited number of characters can be displayed at one time, by performing repeated scroll display of the menu item character string from right to left.

If for example, menu item [Long Video] is positioned in the identification frame 302 and selected in the guidance status jog-dial window 300 corresponding to this menu item [Capture Mode], the CPU 50 establishes a state in which the function corresponding to menu item [Long Video] can be executed, and also displays the character of menu item [Long Video] in orange, thereby enabling the user to recognize easily that menu item [Long Video] is currently selected.

At this time, the CPU 50 does not erase the jog-dial window 300 when menu item [Long Video] is selected, and displays unselected menu items also in the item display area 301 in normal color, thereby enabling the user to select the other menu items [Still] and [Video Mail], on the spot and rapidly, by manipulating the jog-dial 30.

Incidentally, if the Shift key is pressed by the user while the guidance status jog-dial window 300 corresponding to [Smart Capture] (FIG. 30) is displayed, the CPU 50 displays two kinds of menu item data D100f titles ([Detailed Menu] and [Simple Menu]) in the item display area 301 on the basis of the duplication status flag D100e.

In this way, the CPU 50 can rapidly switch between display of [Detailed Menu] and [Simple Menu] menu items according to whether or not the Shift key is pressed by the user, and can also efficiently display two kinds of hierarchically-structured menus in the item display area 301, with its limited display area.

According to the above configuration, by displaying the hierarchy icon 305 indicating the existence of a lower-level sub-menu to the right of menu items, the notebook personal computer with jog-dial 1 can enable the user to recognize easily the existence of a lower-level sub-menu before a menu item is actually selected.

Also, the notebook personal computer with jog-dial 1 can drastically improve user-friendliness by, after indicating to the user by means of the hierarchy icon 305 menu items for which a lower-level sub-menu exists, providing for menu item selection, and processing corresponding to that selected menu item, to be executed simply by rotational manipulation and pushing manipulation of the jog-dial 30 by the user.

Furthermore, according to the above configuration, if a menu item comprising a character string of 13 or more characters is positioned in the identification frame 302 of the item display area 301, by repeated scroll display from right to left of the menu item character string, the notebook personal computer with jog-dial 1 can enable the user to recognize the menu item character string easily and certainly even within the identification frame 302, which is a display area in which a limited number of characters can be displayed at one time, and thus prevent mistakes in the selection of menu items.

Also, the notebook personal computer with jog-dial 1 can drastically improve operability, from menu item selection to execution, by executing processing corresponding to the menu item selected by pushing manipulation of the jog-dial 30, after enabling the user to recognize a menu item character string by performing scroll display of a character string positioned in the identification frame 302 in accordance with rotational manipulation of the jog-dial 30.

Still further, according to the above configuration, when the menu item positioned in the identification frame.302 of the item display area 301 by rotational manipulation and pushing manipulation of the jog-dial window 300 is selected, by establishing a state in which the function corresponding to that selected menu item can be executed, and also displaying the character string of the selected menu item in orange, the notebook personal computer with jog-dial 1 can enable the user to recognize the currently selected menu item easily.

(4) Other Embodiments

In the above described embodiment, the case is described in which the user is given indication of the existence of a lower-level menu by displaying a triangular hierarchy icon 305, but the present invention is not limited to this, and it is also possible to display an icon consisting of any of various other shapes or marks, such as a right-facing arrow. In these cases, also, the same kind of effects can be obtained as with the above described embodiment.

Also, in the above described embodiment, the case is described in which the character string of a menu item selected by the user is displayed in orange to indicate to the user that that menu item is currently selected, but the present invention is not limited to this, and as long as it is possible to indicate to the user that a menu item is currently selected, the menu item character string can be displayed in various other colors, or can be displayed in bold type.

Further, in the above described embodiment, the case is described in which either of two kinds of menu items, [Detailed Menu] or [Simple Menu], are displayed according to whether the Shift key is pressed or is not pressed, respectively, but the present invention is not limited to this, and it is also possible to display hierarchically-structured menus of three or more kinds according to whether the Shift key is not pressed, is pressed once, is pressed twice, etc., respectively.

Also, in the above described embodiment, the case is described in which, if the number of characters of the menu item positioned in the identification frame 302 is 13 or more, the characters in the identification frame 302 are scroll-displayed from right to left, but the present invention is not limited to this, and it is also possible to perform scroll display with ten or more characters.

Moreover, in the above described embodiment, the case is described in which the CPU 50 performs display of the hierarchy icon 305, scroll display of all menu items, scroll display of the characters of the menu item positioned in the identification frame 302, display of two kinds of menu items, [Detailed Menu] or [Simple Menu] according to whether the Shift key is pressed or is not pressed, and so forth, on the basis of the jog-dial utility program 311 stored beforehand in the hard disk of the HDD 67, but the present invention is not limited to this, and it is also possible to perform the above described display processing by installing a program storage medium on which the jog-dial utility program 311 is recorded.

As the program storage medium used to install the jog-dial utility program 311 that executes the above described series of display processing items in the notebook personal computer with jog-dial 1 in this way, and to establish a state in which execution is possible by the notebook personal computer with jog-dial 1, implementation is possible not only by package media such as a floppy disk, Compact Disc-Read Only Memory (CD-ROM), Digital Versatile Disc (DVD), etc., but also by semiconductor memory or magnetic disk in which programs are stored temporarily or permanently. Also, as means for storing a program in these program storage media, it is possible to use cable or wireless communication media such as a local area network, the Internet, digital satellite broadcasting, and so forth, and it is also possible for programs to be stored via various kinds of communication interface such as a router or modem.

Also, in the above described embodiment, the case is described in which the information processing apparatus of the present invention is applied to a notebook type personal computer 1, but the present invention is not limited to this, and this information processing apparatus can also be applied to a desktop type personal computer.

Further, in the above described embodiment, the case is described in which the notebook type personal computer 1 as the information processing apparatus of the present invention is configured by the CPU 50 as menu display means for displaying a prescribed menu on a display screen, and the CPU 50 as control means for displaying, for hierarchically-structured menu items within a menu displayed by that CPU 50, an icon indicating a hierarchical structure together with the menu items on the display screen, but the present invention is not limited to this, and the information processing apparatus can also be configured by various other menu display means and control means.

Further, in the above described embodiment, the case is described in which the notebook type personal computer 1 as the information processing apparatus of the present invention is configured by the CPU 50 as menu display means for displaying a prescribed menu on a display screen, and the CPU 50 as control means for performing scroll display of a character string indicating a menu item of a menu displayed by that CPU 50, but the present invention is not limited to this, and the information processing apparatus can also be configured by various other menu display means and control means.

Further, in the above described embodiment, the case is described in which the notebook type personal computer 1 as the information processing apparatus of the present invention is configured by the CPU 50 as menu display means for displaying a prescribed menu on a display screen, the jog-dial 30 as menu selecting means for selecting any of a plurality of menu items from a menu displayed on a display screen by that CPU 50, and the CPU 50 as control means for displaying the menu item selected by that jog-dial 30 with its display state changed, but the present invention is not limited to this, and the information processing apparatus can also be configured by various other menu display means, menu selecting means, and control means.

According to the present invention, as described above, by displaying a prescribed menu on a display screen, and displaying, for hierarchically-structured menu items within that displayed menu, an icon indicating a hierarchical structure together with the menu items on the display screen, it is possible to enable the user to recognize easily, at the point in time at which a menu item is displayed, whether or not that menu item is hierarchically structured.

Furthermore, according to the present invention, as described above, by displaying a prescribed menu on a display screen, and performing scroll display of a character string indicating a menu item of that displayed menu, it is possible for the user to read the entire character string from beginning to end by means of scroll display, and so recognize it, even if the character string indicating a menu item does not fit into a limited display area.

Still further, according to the present invention, as described above, by displaying a prescribed menu on a display screen, selecting any of a plurality of menu items from that displayed menu, and displaying that selected menu item changed to a prescribed display state, it is possible to enable the user to recognize the currently selected menu item easily, simply by having the user confirm the menu item for which the display state has changed.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An information processing apparatus comprising:
    menu display means for displaying a prescribed menu on a display screen; and
    control means for changing display forms of said menu according to the attributes of said menu displayed by said menu display means;
    wherein said control means performs scroll-display of a character string indicating a menu item of said menu displayed by said menu display means, and
    said control means performs lateral scroll-display of said character string when the character string indicating said menu item exceeds a prescribed number of characters.

2. An information processing method comprising:
    displaying a prescribed menu on a display screen; and
    controlling display to change display forms of said menu according to the attributes of said menu displayed by menu display means;
    wherein said step of controlling display includes performing scroll-display of a character string indicating a menu item of said menu displayed by said menu display step, and
    said step of controlling display includes performing lateral scroll-display of said character string when the character string indicating said menu item exceeds a prescribed number of characters.

3. A program storage medium for storing a program comprising executable instructions which when executed in an information processing apparatus cause the information processing apparatus to perform the following steps:
    displaying a prescribed menu on a display screen; and
    controlling display to change display forms of said menu according to the attributes of said menu displayed by said menu display means;
    wherein said step of controlling display includes performing scroll-display of a character string indicating a menu item of said menu displayed by said menu display step, and
    said step of controlling display includes performing lateral scroll-display of said character string when the character string indicating said menu item exceeds a prescribed number of characters.

* * * * *